(12) United States Patent
Kanamori et al.

(10) Patent No.: US 11,591,437 B2
(45) Date of Patent: Feb. 28, 2023

(54) POLYCARBONATE DIOL, POLYCARBONATE DIOL-CONTAINING COMPOSITION, POLYCARBONATE DIOL PRODUCTION METHOD, AND POLYURETHANE

(71) Applicant: MITSUBISHI CHEMICAL CORPORATION, Chiyoda-ku (JP)

(72) Inventors: Yoshikazu Kanamori, Chiyoda-ku (JP); Yuta Hioki, Chiyoda-ku (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 785 days.

(21) Appl. No.: 16/507,079

(22) Filed: Jul. 10, 2019

(65) Prior Publication Data

US 2019/0330421 A1 Oct. 31, 2019

Related U.S. Application Data

(63) Continuation of application No. PCT/JP2018/000300, filed on Jan. 10, 2018.

(30) Foreign Application Priority Data

Jan. 10, 2017 (JP) ............................. JP2017-001929

(51) Int. Cl.
| | |
|---|---|
| C08G 64/02 | (2006.01) |
| C09J 7/38 | (2018.01) |
| C08G 18/08 | (2006.01) |
| C08G 18/10 | (2006.01) |
| C08G 18/44 | (2006.01) |
| C08G 18/67 | (2006.01) |
| C08G 18/75 | (2006.01) |
| C08G 64/30 | (2006.01) |

(Continued)

(52) U.S. Cl.
CPC ..... *C08G 64/0208* (2013.01); *C08G 18/0852* (2013.01); *C08G 18/10* (2013.01); *C08G 18/44* (2013.01); *C08G 18/676* (2013.01); *C08G 18/758* (2013.01); *C08G 64/02* (2013.01); *C08G 64/305* (2013.01); *C08K 5/13* (2013.01); *C08L 75/06* (2013.01); *C08L 75/16* (2013.01); *C09D 175/06* (2013.01); *C09D 175/12* (2013.01); *C09J 7/38* (2018.01); *C09J 175/06* (2013.01); *C09J 175/12* (2013.01); *C09J 2475/00* (2013.01)

(58) Field of Classification Search
CPC .............. C08G 64/0208; C08G 64/305; C08G 18/0852; C08G 18/10; C08G 18/44; C08G 18/676; C08G 18/758; C08G 64/02; C08K 5/13; C09D 175/12; C09D 175/06; C09J 7/38; C09J 175/12; C09J 2475/00; C09J 175/06; C08L 75/16; C08L 75/06

See application file for complete search history.

(56) References Cited

U.S. PATENT DOCUMENTS

| 4,855,377 A | 8/1989 | Yokota et al. |
| 5,070,173 A | 12/1991 | Yokota et al. |

(Continued)

FOREIGN PATENT DOCUMENTS

| CN | 101955583 A | 1/2011 |
| CN | 102666626 A | 9/2012 |

(Continued)

OTHER PUBLICATIONS

Combined Chinese Office Action and Search Report dated Aug. 6, 2021 in Chinese Patent Application No. 201880006312.X (with unedited computer generated English translation), 25 pages.

(Continued)

*Primary Examiner* — Rabon A Sergent
(74) *Attorney, Agent, or Firm* — Oblon, McClelland, Maier & Neustadt, L.L.P.

(57) ABSTRACT

Provided is a polycarbonate polyol used as a raw material of a polyurethane that yields a polyurethane solution having good storage stability and exhibits excellent flexibility and solvent resistance. This polycarbonate polyol is a polycarbonate diol that includes structural units represented by the following Formulae (A) and (B), wherein, $R^1$ and $R^2$ each independently represent an alkyl group having 1 to 4 carbon atoms and, in this range of the number of carbon atoms, optionally have an oxygen atom, a sulfur atom, a nitrogen atom, a halogen atom, or a substituent containing these atoms; and $R^3$ represents a linear aliphatic hydrocarbon having 3 or 4 carbon atoms. This polycarbonate diol has a molecular weight of 500 to 5,000, and the value of the following Formula (I) is 0.3 to 20.0: (Content ratio of branched-chain moiety in polymer)/(Content ratio of carbonate group in polymer)×100(%) (I).

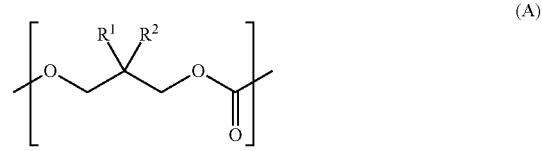

(A)

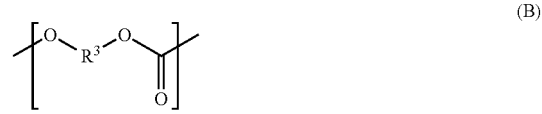

(B)

19 Claims, No Drawings

(51) Int. Cl.
*C09D 175/12* (2006.01)
*C09J 175/12* (2006.01)
*C09J 175/06* (2006.01)
*C08L 75/06* (2006.01)
*C08L 75/16* (2006.01)
*C09D 175/06* (2006.01)
*C08K 5/13* (2006.01)

(56) References Cited

U.S. PATENT DOCUMENTS

| | | | |
|---|---|---|---|
| 2001/0047073 A1* | 11/2001 | Mizia | C08G 64/305 528/196 |
| 2008/0146766 A1 | 6/2008 | Masubuchi et al. | |
| 2015/0291724 A1 | 10/2015 | Kusano et al. | |
| 2016/0002378 A1 | 1/2016 | Shimizu et al. | |
| 2018/0186920 A1 | 7/2018 | Kusano et al. | |

FOREIGN PATENT DOCUMENTS

| | | |
|---|---|---|
| EP | 2 514 779 A1 | 10/2012 |
| JP | 2-28961 6 | 11/1990 |
| JP | 5-51428 | 3/1993 |
| JP | 2005-206674 | 8/2005 |
| JP | 2009-149810 | 7/2009 |
| JP | 2010-241990 | 10/2010 |
| JP | 2011-162643 | 8/2011 |
| JP | 2011-162646 | 8/2011 |
| JP | 2011-162908 | 8/2011 |
| JP | 2011-190390 | 9/2011 |
| JP | 2011-190392 | 9/2011 |
| JP | 2012-77280 | 4/2012 |
| JP | 2015-143316 | 8/2015 |
| JP | 2016-27073 | 2/2016 |
| KR | 10-2015-0132224 A | 11/2015 |
| WO | WO 2006/088152 A1 | 8/2006 |
| WO | WO 2011/074617 A1 | 6/2011 |

OTHER PUBLICATIONS

Korean Office Action dated Sep. 15, 2021 in Korea Patent Application No. 10-2019-7021636 (with unedited computer generated English translation), 18 pages.

Office Action dated Jul. 6, 2021 in corresponding Japanese Patent Application No. 2018-550308 (with English Translation), 10 pages.

International Search Report dated Apr. 10, 2018 in PCT/JP2018/000300 filed Jan. 10, 2018 (with English Translation).

Notification of Transmittal of Translation of the International Preliminary Report on Patentability dated Jul. 25, 2019, in PCT/JP2018/000300, 11 pages.

Extended European Search Report dated Feb. 24, 2020 in Patent Application No. 18722880.4, 9 pages.

Combined Chinese Office Action and Search Report dated Nov. 23, 2020, in Chinese Patent Application No. 201880006312.X (with English translation), 16 pages.

\* cited by examiner

POLYCARBONATE DIOL, POLYCARBONATE DIOL-CONTAINING COMPOSITION, POLYCARBONATE DIOL PRODUCTION METHOD, AND POLYURETHANE

CROSS-REFERENCE TO RELATED APPLICATION

This is a continuation of International Application PCT/JP2018/000300, filed on Jan. 10, 2018, and designated the U.S., and claims priority from Japanese Patent Application 2017-001929 which was filed on Jan. 10, 2017, the entire contents of which are incorporated herein by reference.

TECHNICAL FIELD

The present invention relates to: a polycarbonate diol useful for polycarbonate-based polyurethanes; a polycarbonate diol-containing composition; a method of producing a polycarbonate diol; and a polyurethane.

BACKGROUND ART

Polycarbonate diols are used as raw materials for soft segments of polyurethanes and thermoplastic elastomers that are used in artificial leathers, synthetic leathers, paints, coating agents, adhesives and the like, and such polycarbonate diols are widely used as high durability-imparting raw materials that are excellent in, for example, heat resistance, weather resistance and hydrolysis resistance that are otherwise regarded as drawbacks of polyether polyols and polyester polyols.

Widely-used polycarbonate diols synthesized from 1,6-hexane diol are crystalline polycarbonate diols and, particularly, when used in the fields of paints or coating, such polycarbonate diols are likely to cause crystallization of a polyurethane resin solution and thus present a problem in storage stability. Moreover, in recent years, highly durable polyurethane products are demanded to exert durability in various situations. For examples, in terms of solvent resistance and contamination resistance, polycarbonate diols synthesized from 1,6-hexanediol cannot satisfy the demands for high solvent resistance and high contamination resistance.

With regard to the storage stability of polyurethane solutions, a number of amorphous polycarbonate diols have been proposed. Examples thereof include polycarbonate diols obtained by combining two aliphatic linear diols, such as one obtained by copolymerizing 1,6-hexanediol and 1,5-pentanediol, and one obtained by copolymerizing 1,6-hexanediol and 1,4-butanediol (Patent Documents 1 and 2).

Further, since an amorphous polycarbonate diol is obtained by reducing the crystallinity of a polycarbonate diol through copolymerization of a branched aliphatic diol with the polycarbonate diol, there have been proposed, for example, a polycarbonate diol obtained by copolymerizing 2-methyl-1,3-propanediol and an aliphatic linear diol, a polycarbonate diol obtained by copolymerizing neopentyl glycol and other diol, and a polycarbonate diol obtained by copolymerizing 2-butyl-2-ethyl-1,3-propanediol and an aliphatic linear diol (Patent Documents 3 to 5).

Meanwhile, with regard to solvent resistance and contamination resistance, a polycarbonate diol having superior solvent resistance and contamination resistance is obtained as the molecular weight of a diol component constituting the polycarbonate diol is reduced and the ratio of the diol component having a small molecular weight is increased (Patent Document 6). However, since such a polycarbonate diol itself is strongly cohesive, the polycarbonate diol has a high crystallinity, and a polyurethane solution produced therefrom tends to have poor storage stability.

RELATED ART DOCUMENTS

Patent Documents

[Patent Document 1] Japanese Laid-open Patent Application (Kokai) No. H5-51428
[Patent Document 2] Japanese Laid-open Patent Application (Kokai) No. H2-289616
[Patent Document 3] WO 2006-88152
[Patent Document 4] WO 2011-74617
[Patent Document 5] Japanese Laid-open Patent Application (Kokai) No. 2010-241990
[Patent Document 6] Japanese Laid-open Patent Application (Kokai) No. 2009-149810

SUMMARY OF THE INVENTION

Problems to be Solved by the Invention

In these conventional technologies, a crystalline polycarbonate diol can be used for improving the chemical resistance and the contamination resistance; however, the storage stability of a polyurethane solution is not satisfactory. Moreover, the storage stability of a polyurethane solution may be improved by a copolymerized polycarbonate diol; however, the chemical resistance and the contamination resistance of the polyurethane are insufficient. In addition, in the case of a polycarbonate diol containing a branched diol as a copolymerized component, the flexibility at low temperatures is sometimes largely reduced. There has not been obtained a polycarbonate diol which can satisfy the demands for the physical properties and storage of a polyurethane, such as chemical resistance, contamination resistance and low-temperature flexibility of a polyurethane and the storage stability of a polyurethane solution.

Means for Solving the Problems

The present inventors intensively studied to solve the above-described problems and consequently discovered that a polycarbonate diol having a specific composition satisfies the above-described physical properties, thereby completing the present invention.

That is, the gist of the present invention is as follows.

[1] A polycarbonate diol including: a structural unit represented by the following Formula (A); and a structural unit represented by the following Formula (B):

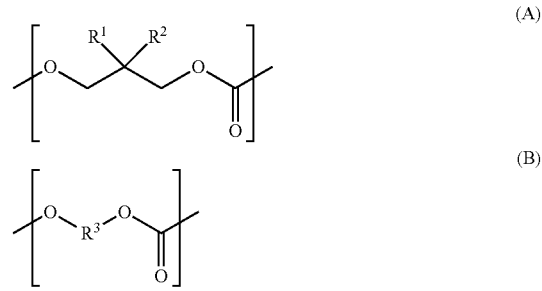

(wherein, $R^1$ and $R^2$ each independently represent an alkyl group having 1 to 4 carbon atoms and, in this range of the number of carbon atoms, optionally have an oxygen atom, a sulfur atom, a nitrogen atom, a halogen atom, or a substituent containing these atoms; and $R^3$ represents a linear aliphatic hydrocarbon having 3 or 4 carbon atoms), wherein the polycarbonate diol has a number-average molecular weight of 500 to 5,000, and the value of the following Formula (I) is 0.3 to 20.0:

(Content ratio of branched-chain moiety in polymer)/
(Content ratio of carbonate group in polymer)×
100(%)      (I).

[2] The polycarbonate diol according to [1], wherein the value of the following Formula (I) is 0.5 to 8.0:

(Content ratio of branched-chain moiety in polymer)/
(Content ratio of carbonate group in polymer)×
100(%)      (I).

[3] The polycarbonate diol according to [1] or [2], wherein the structural unit represented by Formula (A) is derived from 2,2-dimethyl-1,3-propanediol.

[4] The polycarbonate diol according to [1] or [2], wherein the structural unit represented by Formula (A) is derived from 2-butyl-2-ethyl-1,3-propanediol.

[5] The polycarbonate diol according to any one of [1] to [4], wherein the structural unit represented by Formula (B) is derived from 1,4-butanediol.

[6] The polycarbonate dial according to any one of [1] to [5], wherein a ratio of the number of terminal groups derived from a carbonate compound in the polycarbonate diol is 5.0% by mole or less with respect to the number of all terminal groups.

[7] The polycarbonate diol according to any one of [1] to [6], wherein the amount of the heat of fusion of a melting peak is 0.1 J/g to 10 J/g as measured by a differential scanning calorimeter.

[8] A polycarbonate diol-containing composition, including a polycarbonate diol that contains a structural unit represented by the following Formula (A) and a structural unit represented by the following Formula (B):

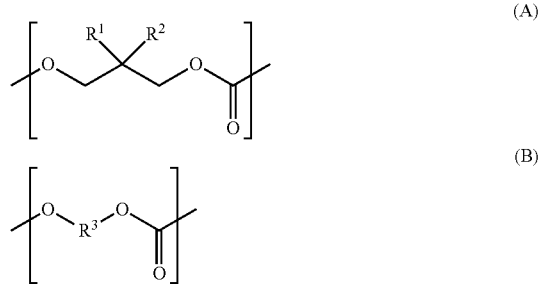

(wherein, $R^1$ and $R^2$ each independently represent an alkyl group having 1 to 4 carbon atoms and, in this range of the number of carbon atoms, optionally have an oxygen atom, a sulfur atom, a nitrogen atom, a halogen atom, or a substituent containing these atoms; and $R^3$ represents a linear aliphatic hydrocarbon having 3 or 4 carbon atoms), wherein the polycarbonate diol has a molecular weight of 500 to 5,000, the value of the following Formula (I) is 0.3 to 20.0:

(Content ratio of branched-chain moiety in polymer)/
(Content ratio of carbonate group in polymer)×
100(%)      (I), and the content of a hydroxyaryl compound is 0.1% by weight or less.

[9] The polycarbonate diol-containing composition according to [8], including at least one metal selected from Groups 1 and 2 of the periodic table.

[10] The polycarbonate diol-containing composition according to [9], wherein the content of the metal in the polycarbonate diol-containing composition is 100 ppm by weight or less.

[11] A method of producing a polycarbonate diol, the method including the step of performing a polymerization reaction of at least one carbonate compound (i) selected from the group consisting of dialkyl carbonates, diaryl carbonates and alkylene carbonates, a diol (ii) represented by the following Formula (C), and a diol (iii) represented by the following Formula (D) in the presence of a metal compound catalyst:

(wherein, $R^1$ and $R^2$ each independently represent an alkyl group having 1 to 4 carbon atoms and, in this range of the number of carbon atoms, optionally have an oxygen atom, a sulfur atom, a nitrogen atom, a halogen atom, or a substituent containing these atoms; and $R^3$ represents a linear aliphatic hydrocarbon having 3 or 4 carbon atoms), wherein the polycarbonate diol has a value of the following Formula (I) of 0.3 to 20.0:

(Content ratio of branched-chain moiety in polymer)/
(Content ratio of carbonate group in polymer)×
100(%)      (I).

[12] A polyurethane obtainable from the polycarbonate diol according to any one of [1] to [7].

[13] A polyurethane obtainable from the polycarbonate diol-containing composition according to any one of [8] to [10].

[14] An artificial leather or a synthetic leather, obtainable using the polyurethane according to [12] or [13].

[15] A paint or a coating agent, obtainable using the polyurethane according to [12] or [13].

[16] A thermosetting elastomer or a thermoplastic elastomer, obtainable using the polyurethane according to [12] or [13].

[17] An aqueous polyurethane paint obtainable using the polyurethane according to [12] or [13].

[18] A pressure-sensitive adhesive or an adhesive, obtainable using the polyurethane according to [12] or [13].

[19] An active energy ray-curable polymer composition obtainable using the polycarbonate diol according to any one of [1] to [7].

Effects of the Invention

According to the present invention, a polycarbonate diol which is, when processed into a polyurethane, capable of imparting the polyurethane with excellent physical properties in terms of chemical resistance, contamination resistance, low-temperature flexibility, heat resistance and the like and, despite of being a solid raw material, yields a polyurethane solution having excellent storage stability, can be provided.

For example, in artificial leathers, synthetic leathers, thermoplastic polyurethane elastomers, paints and coating materials that are produced using the polycarbonate diol of the present invention, the durability such as chemical resistance, contamination resistance and heat resistance as well as the texture are improved, and a solution of a polyurethane using the polycarbonate diol of the present invention can be stored over a long time upon processing; therefore, the polycarbonate diol of the present invention is extremely useful industrially.

Mode for Carrying Out the Invention

Embodiments of the present invention will now be described in detail; however, the present invention is not restricted to the below-described embodiments and can be carried out with various modifications within the range of its gist.

[1. Polycarbonate Diol]

One aspect of the present invention is a polycarbonate diol that contains a structural unit represented by the following Formula (A) and a structural unit represented by the following Formula (B).

This polycarbonate diol is constituted by repetitive structural units represented by the following Formulae (A) and (B), and it is particularly preferred that the polycarbonate diol be constituted by randomly repetitive structural units represented by the following Formulae (A) and (B):

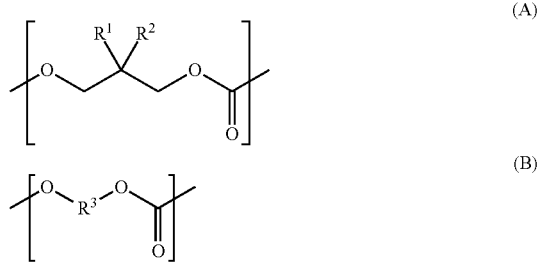

In Formula (A), $R^1$ and $R^2$ each independently represent an alkyl group having 1 to 4 carbon atoms and, in this range of the number of carbon atoms, optionally have an oxygen atom, a sulfur atom, a nitrogen atom, a halogen atom, or a substituent containing these atoms. In Formula (B), $R^3$ represents a linear aliphatic hydrocarbon having 3 or 4 carbon atoms.

<1-1. Structural Characteristics>

In Formula (A), usually, $R^1$ and $R^2$ may each independently be an alkyl group having 1 to 4 carbon atoms or an alkyl group having 1 to 2 carbon atoms; however, from the standpoint of attaining good polymerization reactivity, chemical resistance, heat resistance and low-temperature flexibility, $R^1$ and $R^2$ are each preferably a methyl group, an ethyl group, an n-propyl group or an n-butyl group, most preferably a methyl group. Further, within the above-described range of the number of carbon atoms, $R^1$ and $R^2$ may each have an oxygen atom, a sulfur atom, a nitrogen atom, a halogen atom, or a substituent containing these atoms.

In Formula (B), $R^3$ is a linear aliphatic hydrocarbon having 3 or 4 carbon atoms and, in this case, good polymerization reactivity, chemical resistance and low-temperature flexibility are attained. Further, $R^3$ may contain a hetero atom.

The polycarbonate diol according to one aspect of the present invention contains a structural unit represented by Formula (A) and a structural unit represented by Formula (B). By containing the structural unit represented by Formula (A) and the structural unit represented by Formula (B), when the polycarbonate diol is processed into a polyurethane, not only good chemical resistance is attained and the low-temperature flexibility, the heat resistance and the like are improved, but also a solution of the polyurethane has good storage stability.

From the standpoints of the chemical resistance and the flexibility when the polycarbonate diol is processed into a polyurethane, the total ratio of the structural unit represented by Formula (A) and the structural unit represented by Formula (B) with respect to all structural units of the polycarbonate diol is preferably 50% by mole or higher, more preferably 70% by mole or higher, still more preferably 80% by mole or higher, particularly preferably 90% by mole or higher, most preferably 95% by mole or higher.

In addition, the ratio of the structural unit represented by Formula (A) and the structural unit represented by Formula (B) (hereinafter, may be referred to as "(A):(B)") is, in terms of molar ratio, preferably 0.2:99.8 to 40:60, more preferably 1:99 to 15:85, still more preferably 2:98 to 12:88, yet more preferably 3:97 to 10:90, most preferably 4:96 to 10:90. When the structural unit represented by Formula (A) is 2,2-dimethyl-1,3-propanediol, the ratio is preferably 0.5:99.5 to 37:63. Further, when the structural unit represented by Formula (A) is 2-butyl-2-ethyl-1,3-propanediol, the ratio is preferably 0.2:99.8 to 12:88. When the content ratio of the structural unit represented by Formula (A) is higher than the above-described upper limit, the chemical resistance and the low-temperature flexibility of a polyurethane produced using the polycarbonate diol may be insufficient. Meanwhile, when the content ratio of the structural unit represented by Formula (A) is lower than the above-described lower limit, the storage stability of a solution of the polyurethane may be deteriorated. In cases where the ratio of the structural unit represented by Formula (A) and the structural unit represented by Formula (B) in the polycarbonate diol is determined in terms of molar ratio, the ratio can be determined by performing $^1$H-NMR spectroscopy and calculating the ratio from the integral values of the respective structural units.

The polycarbonate diol according to one aspect of the present invention is characterized by containing the structural unit represented by Formula (A) and the structural unit represented by Formula (B) and, from the standpoints of the storage stability as a polyurethane solution and the low-temperature flexibility, the polycarbonate diol is preferably a copolymer.

The ratio of a structural unit derived from each diol compound with respect to all structural units of the polycarbonate diol can be determined by a gas chromatography analysis of each diol compound obtained by hydrolyzing the polycarbonate diol with an alkali.

<1-2. (Content Ratio of Branched-Chain Moiety in Polymer)/(Content Ratio of Carbonate Group in Polymer)>

In the polycarbonate diol according to one aspect of the present invention, the value of the following Formula (I) is preferably 0.3 to 20.0:

(Content ratio of branched-chain moiety in polymer)/
(Content ratio of carbonate group in polymer)×
100(%)     (I).

In Formula (I), the "polymer" represents the polycarbonate diol. The "content ratio of branched-chain moiety in polymer" represents a value obtained by dividing the total weight of $R^1$ and $R^2$ of Formula (A) contained in 1 mol of the polycarbonate diol by the number-average molecular weight of the polycarbonate diol that is calculated from the hydroxyl value.

The "content ratio of carbonate group in polymer" represents a value obtained by dividing the weight of carbonate groups in 1 mol of the polycarbonate diol by the number-average molecular weight of the polycarbonate diol that is calculated from the hydroxyl value.

The value of Formula (I) is usually 20.0 or smaller, preferably 15.0 or smaller, more preferably 10.0 or smaller, still more preferably 8.0 or smaller, yet still more preferably 7.0 or smaller, yet still more preferably 6.0 or smaller, particularly preferably 5.5 or smaller, most preferably 5.0 or smaller. When the value of Formula (I) is larger than this upper limit, the flexibility (particularly, low-temperature flexibility) and the chemical resistance of a polyurethane produced using the polycarbonate diol may be deteriorated.

The value of Formula (I) is usually 0.3 or larger, preferably 0.5 or larger, more preferably 0.7 or larger, still more preferably 1.0 or larger, particularly preferably 1.5 or larger, most preferably 2.0 or larger. When the value of Formula (I) is smaller than this lower limit, deterioration in the ease of handling of the polycarbonate diol and deterioration in the storage stability of a polyurethane solution produced using the polycarbonate diol as a raw material may be observed.

<1-3. Diol Compound>

Examples of a compound represented by the following Formula (C), which is a diol compound used as a raw material of the polycarbonate diol according to one aspect of the present invention, include 2,2-dialkyl-substituted 1,3-propanediols (hereinafter, may be referred to as "2,2-dialkyl-1,3-propanediols": wherein, the alkyl groups are each an alkyl group having 1 to 4 carbon atoms), such as 2,2-dimethyl-1,3-propanediol (hereinafter, may be referred to as "neopentyl glycol" or "NPG"), 2-butyl-2-ethyl-1,3-propanediol (hereinafter, may be referred to as "butylethylpropanediol" or "BEPD"), and 2,2-diethyl-1,3-propanediol. These compounds represented by the following Formula (C) may be used singly, or a plurality thereof may be used in combination.

In Formula (C), $R^1$ and $R^2$, which are the same as $R^1$ and $R^2$ in Formula (A), each independently represent an alkyl group having 1 to 4 carbon atoms and, in this range of the number of carbon atoms, optionally have an oxygen atom, a sulfur atom, a nitrogen atom, a halogen atom, or a substituent containing these atoms. In Formula (D), $R^3$, which is the same as $R^3$ in Formula (B), represents a linear aliphatic hydrocarbon having 3 or 4 carbon atoms.

The structural unit represented by Formula (A) may be derived from a structure represented by Formula (C). Specifically, a diol-derived structure in Formula (A) is preferably based on a structure typified by 2,2-dialkyl-substituted 1,3-propanediol, such as 2,2-dimethyl-1,3-propanediol, 2-butyl-2-ethyl-1,3-propanediol or 2,2-diethyl-1,3-propanediol, particularly preferably based on a structure typified by 2,2-dimethyl-1,3-propanediol or 2-butyl-2-ethyl-1,3-propanediol.

Further, examples of a compound represented by Formula (D), which is a diol compound used as a raw material of the polycarbonate diol according to one aspect of the present invention, include linear terminal dials, such as 1,3-propanediol and 1,4-butanediol; ether group-containing dials, such as diethylene glycol; thioether diols, such as bishydroxyethyl thioether; branched dials, such as 2-methyl-1,3-propanediol; nitrogen-containing dials, such as diethanolamine; and sulfur-containing diols, such as bis(hydroxyethyl) sulfide. These diol compounds may be used singly, or a plurality thereof may be used in combination.

From the standpoint of reducing the environmental load, the compound represented by Formula (D) is preferably a plant-derived compound. Examples of the compound represented by Formula (D) that can be applied as a plant-derived compound include 1,3-propanediol and 1,4-butanediol.

The structural unit represented by Formula (B) may be derived from a structure represented by Formula (D). Specifically, a diol-derived structure in Formula (B) is preferably based on a structure typified by, for example: a linear terminal diol, such as 1,3-propanediol or 1,4-butanediol; an ether group-containing diol, such as diethylene glycol; a thioether diol, such as bishydroxyethyl thioether; a branched diol, such as 2-methyl-1,3-propanediol; a nitrogen-containing diol, such as diethanolamine; or a sulfur-containing diol, such as bis(hydroxyethyl) sulfide, particularly preferably based on a structure typified by 1,4-butanediol.

<1-4. Carbonate Compound>

A carbonate compound (hereinafter, may be referred to as "carbonic acid diester") that can be used in the production of the polycarbonate diol according to one aspect of the present invention is not restricted as long as it does not impair the effects of the present invention, and examples thereof include dialkyl carbonates, diaryl carbonates, and alkylene carbonates. Thereamong, diaryl carbonates are preferred from the standpoint of reactivity.

Specific examples of the carbonate compound include dimethyl carbonate, diethyl carbonate, dibutyl carbonate, diphenyl carbonate and ethylene carbonate, among which diphenyl carbonate is preferred.

<1-5. Transesterification Catalyst>

The polycarbonate diol according to one aspect of the present invention can be produced by polycondensation of the above-described compound represented by Formula (C), compound represented by Formula (D) and carbonate compound through a transesterification reaction.

In the method of producing the polycarbonate diol, a transesterification catalyst (hereinafter, may be referred to as "catalyst") is used to accelerate polymerization. In this case, if an excessively large amount of the catalyst remains in the resulting polycarbonate diol, the catalyst may interfere with the reaction or overly facilitate the reaction in the production of a polyurethane using the polycarbonate diol.

Therefore, although the amount of the catalyst remaining in the polycarbonate diol-containing composition is not particularly restricted, the content of the catalyst in terms of catalyst metal is preferably not greater than 100 ppm by weight, more preferably not greater than 50 ppm by weight, still more preferably not greater than 10 ppm by weight.

As the transesterification catalyst, any compound that is generally considered to be capable of catalyzing transesterification can be used with no restriction.

Examples of the transesterification catalyst include compounds of Group 1 metals of long-form periodic table (hereinafter, simply referred to as "periodic table"), such as lithium, sodium, potassium, rubidium, and cesium; compounds of periodic table Group 2 metals, such as magnesium, calcium, strontium, and barium; compounds of periodic table Group 4 metals, such as titanium, zirconium, and hafnium; compounds of periodic table Group 9 metals, such as cobalt; compounds of periodic table Group 12 metals, such as zinc; compounds of periodic table Group 13 metals, such as aluminum; compounds of periodic table Group 14 metals, such as germanium, tin, and lead; compounds of periodic table Group 15 metals, such as antimony and bismuth; and compounds of lanthanide metals, such as lanthanum, cerium, europium, and ytterbium.

Thereamong, from the standpoint of increasing the transesterification reaction rate, compounds of periodic table Group 1 metals, compounds of periodic table Group 2 metals, compounds of periodic table Group 4 metals, compounds of periodic table Group 5 metals, compounds of periodic table Group 9 metals, compounds of periodic table Group 12 metals, compounds of periodic table Group 13 metals, and compounds of periodic table Group 14 metals are preferred, and compounds of periodic table Group 1 metals and compounds of periodic table Group 2 metals are more preferred, and compounds of periodic table Group 2 metals are still more preferred. Among the compounds of periodic table Group 1 metals, compounds of lithium, potassium and sodium are preferred, compounds of lithium and sodium are more preferred, and a compound of sodium is still more preferred. Among the compounds of periodic table Group 2 metals, compounds of magnesium, calcium and barium are preferred, compounds of calcium and magnesium are more preferred, and a compound of magnesium is still more preferred. These metal compounds are mainly used as hydroxides, salts or the like. When the metal compounds are used as salts, examples thereof include halide salts, such as chlorides, bromides, and iodides; carboxylates, such as acetates, formates, and benzoates; sulfonates, such as methanesulfonates, toluenesulfonates, and trifluoromethanesulfonates; phosphorus-containing salts, such as phosphates, hydrogen phosphates, and dihydrogen phosphates; acetylacetonate salts; nitrates; sulfates; and carbonates. These catalyst metals can also be used as alkoxides, such as methoxides and ethoxides.

Among the above-described compounds, an acetate, nitrate, sulfate, carbonate, phosphate, hydroxide, halide or alkoxide of at least one metal selected from the periodic table Group 2 metals is preferably used; an acetate, carbonate or hydroxide of a periodic table Group 2 metal is more preferably used; an acetate, carbonate or hydroxide of magnesium or calcium is more preferably used; an acetate of magnesium or calcium is particularly preferably used; and magnesium acetate is most preferably used.

<1-6. Molecular Chain Terminal>

The molecular chain terminals of the polycarbonate diol according to one aspect of the present invention are mainly hydroxy groups. However, when the polycarbonate dial is obtained by a reaction between a dial and a carbonate compound, non-hydroxy groups may exist as impurities at some of the molecular chain terminals. Specific examples thereof include structures in which a molecular chain terminal is an alkyloxy group or an aryloxy group, many of which are derived from the carbonate compound.

For example, when diphenyl carbonate, dimethyl carbonate, diethyl carbonate or ethylene carbonate is used as the carbonate compound, a phenoxy group (PhO—) as an aryloxy group, a methoxy group (MeO—) as an alkyloxy group, an ethoxy group (EtO—) or a hydroxyethoxy group ($HOCH_2CH_2O$—) may remain as a molecular chain terminal, respectively (wherein, Ph represents a phenyl group, Me represents a methyl group, and Et represents an ethyl group).

In the molecular chain terminals of the polycarbonate diol according to one aspect of the present invention, the ratio of the total number of terminals derived from the compound represented by Formula (A) and terminals derived from the compound represented by Formula (B) with respect to the number of all terminal groups is preferably 80% by mole or higher, more preferably 90% by mole or higher, still more preferably 95% by mole or higher, particularly preferably 97% by mole or higher, most preferably 99% by mole or higher. By controlling the ratio in this range, the desired molecular weight can be easily attained when the polycarbonate diol is processed into a polyurethane, and the polycarbonate diol can be used as a raw material of a polyurethane having excellent chemical resistance and flexibility.

The ratio of the number of terminal groups derived from the carbonate compound at the molecular chain terminals of the polycarbonate diol is, with the number of all terminal groups, preferably not higher than 10% by mole, more preferably not higher than 5.0% by mole, still more preferably not higher than 3.0% by mole, particularly preferably not higher than 1.0% by mole. When this ratio is higher than the above-described upper limit and the polycarbonate diol is processed into a polyurethane, the molecular weight of the polyurethane is not sufficiently large, and the physical properties such as mechanical strength and chemical resistance may be deteriorated. Meanwhile, when the ratio is lower than the above-described lower limit, deterioration in the ease of handling of the polycarbonate diol and deterioration in the storage stability of a polyurethane solution produced using the polycarbonate diol as a raw material may be observed. It is noted here that, for example, when diphenyl carbonate, dimethyl carbonate or diethyl carbonate is used as the carbonate compound, the molecular chain terminal of the polycarbonate diol is defined as "terminal phenoxy group", "terminal methoxy group" or "terminal ethoxy group", respectively.

The lower limit of the hydroxyl value of the polycarbonate diol is 14 mg-KOH/g, preferably 16 mg-KOH/g, more preferably 18 mg-KOH/g, still more preferably 22 mg-KOH/g. Meanwhile, the upper limit of the hydroxyl value is 450 mg-KOH/g, preferably 230 mg-KOH/g, more preferably 150 mg-KOH/g, still more preferably 120 mg-KOH/g, particularly preferably 75 mg-KOH/g, most preferably 45 mg-KOH/g. When the hydroxyl value is less than the lower limit, an excessively high viscosity may deteriorate the ease of handling of the polycarbonate diol, whereas when the hydroxyl value is higher than the upper limit, the physical properties of a polyurethane produced using the polycarbonate diol, such as chemical resistance and flexibility, may be insufficient.

<1-7. Molecular Weight and Molecular Weight Distribution>

With regard to the number-average molecular weight (Mn) of the polycarbonate diol according to one aspect of the present invention, which is determined from the hydroxyl value, the lower limit is preferably 500, more preferably 600, still more preferably 700, while the upper limit is preferably 5,000, more preferably 4,500, still more preferably 4,000. When the Mn of the polycarbonate diol is less than the lower limit, the flexibility of a polyurethane produced using the polycarbonate diol may be insufficient.

Meanwhile, when the Mn is higher than the upper limit, an increase in the viscosity may deteriorate the ease of handling in polyurethanization.

The molecular weight distribution, which is a ratio of the weight-average molecular weight and the number-average molecular weight (Mw/Mn), of the polycarbonate diol is not particularly restricted; however, the lower limit thereof is preferably 1.5, more preferably 1.8, while the upper limit is preferably 3.5, more preferably 3.0. When the molecular weight distribution is higher than the upper limit, the physical properties, particularly elongation, of a polyurethane produced using this polycarbonate diol tend to be deteriorated, whereas when the molecular weight distribution is less than the lower limit, a high-level purification operation such as removal of oligomers may be required in the production of the polycarbonate diol.

The weight-average molecular weight is in terms of polystyrene, and the number-average molecular weight is determined from the hydroxyl value of the polycarbonate diol. These values can be usually determined by gel permeation chromatography (hereinafter, may be abbreviated as "GPC").

<1-8. Usage Ratio of Raw Materials, Etc.>

In the production of the polycarbonate diol according to one aspect of the present invention, the amount of the carbonate compound to be used is not particularly restricted; however, usually, in terms of molar fraction with respect to a total of 1 mol of the resulting diol, the lower limit of the amount is preferably 0.30, more preferably 0.50, still more preferably 0.60, while the upper limit is preferably 1.00, more preferably 0.99, still more preferably 0.98. When the carbonate compound is used in an amount of greater than the upper limit, there are cases where the ratio of non-hydroxy terminal groups in the resulting polycarbonate diol is increased or the molecular weight of the polycarbonate diol is not controlled in a prescribed range. Meanwhile, when the carbonate compound is used in an amount of less than the lower limit, there are cases where polymerization does not proceed to a prescribed molecular weight.

<1-9. Catalyst Deactivator>

As described above, when a catalyst is used in the polymerization reaction, the catalyst usually remains in the resulting polycarbonate diol, and this residual catalyst may make it impossible to control the polyurethanization reaction. In order to suppress such effect of residual catalyst, it is preferred to add, for example, a phosphorus compound in an amount substantially equimolar to the amount of a transesterification catalyst being used and to thereby deactivate the transesterification catalyst. Further, by performing a heat treatment as described below after the addition, the transesterification catalyst can be efficiently deactivated.

Examples of the phosphorus compound used for the deactivation of the transesterification catalyst include inorganic phosphoric acids, such as phosphoric acid and phosphorous acid; and organic phosphoric acid esters, such as dibutyl phosphate, tributyl phosphate, trioctyl phosphate, triphenyl phosphate, and triphenyl phosphite.

These phosphorus compounds may be used singly, or in combination of two or more thereof.

The amount of the phosphorus compound to be used is not particularly restricted; however, as described above, it may be substantially equimolar to the amount of the transesterification catalyst used. Specifically, with respect to 1 mol of the transesterification catalyst used, the upper limit is preferably 5 mol, more preferably 2 mol, while the lower limit is preferably 0.8 mol, more preferably 1.0 mol. If the phosphorus compound is used in a smaller amount, the transesterification catalyst in the reaction product would not be sufficiently deactivated; therefore, when the resulting polycarbonate diol is used as, for example, a raw material for the production of a polyurethane, the reactivity of the polycarbonate diol with isocyanate groups cannot be adequately reduced in some cases. Meanwhile, the use of the phosphorus compound in an amount greater than the above-described range may cause coloration in the resulting polycarbonate diol.

The deactivation of the transesterification catalyst by an addition of the phosphorus compound can be performed at room temperature; however, it is more efficiently performed with a heat treatment. Although the temperature of this heat treatment is not particularly restricted, the upper limit thereof is preferably 150° C., more preferably 120° C., still more preferably 100° C., while the lower limit is preferably 50° C., more preferably 60° C., still more preferably 70° C. At a temperature of lower than this lower limit, the deactivation of the transesterification catalyst takes time and is thus not efficient, and the degree of the deactivation may be insufficient as well. Meanwhile, at a temperature of higher than the upper limit, the resulting polycarbonate diol may be colored.

The duration of the reaction with the phosphorus compound is not particularly restricted; however, it is usually 1 to 5 hours.

<1-10. Residual Monomers, Etc.>

In the polycarbonate diol, the carbonate compound used as a raw material in the production may remain as a hydroxyaryl compound (aryloxy compound), and a polycarbonate diol-containing composition that contains the polycarbonate diol and such a hydroxyaryl compound is also one aspect of the present invention. The content of the hydroxyaryl compound in the polycarbonate diol-containing composition is not restricted; however, the lower the content, the more preferred it is, and the content of the hydroxyaryl compound is preferably not higher than 0.1% by weight, more preferably not higher than 0.05% by weight.

Further, the above-described transesterification catalyst may remain in the polycarbonate diol, and a polycarbonate diol-containing composition that contains the polycarbonate diol and a metal is also one aspect of the present invention. The metal contained in the polycarbonate diol-containing composition is not particularly restricted; however, the polycarbonate diol-containing composition preferably contains at least one metal selected from Groups 1 and 2 of the periodic table.

The content of the metal in the polycarbonate diol-containing composition is preferably 100 ppm by weight or less, more preferably 50 ppm by weight or less, still more preferably 10 ppm by weight or less.

When an aromatic carbonic acid diester such as diphenyl carbonate is used as a raw material, phenols are generated as by-products during the production of the polycarbonate diol. Phenols are mono functional compounds and can thus act as inhibitory factors in the production of a polyurethane. In addition, since urethane bonds formed by phenols have a weak bonding force, they are dissociated by heat in the later step or the like, allowing isocyanates and phenols to be regenerated, which potentially causes a problem. Moreover, since phenols are irritating substances, the smaller the amount of the phenols remaining in the polycarbonate diol, the more preferred it is. Specifically, the amount of the phenols is, in terms of weight ratio with respect to the polycarbonate diol, preferably 1,000 ppm or less, more preferably 500 ppm or less, still more preferably 300 ppm or less, particularly preferably 100 ppm or less. In order to reduce the amount of the phenols remaining in the polycarbonate diol, as described below, it is effective to control the pressure during the polymerization reaction of the polycarbonate diol to be a high vacuum of 1 kPa or less in terms of absolute pressure, or to perform thin-film distillation and the like after the polymerization of the polycarbonate diol.

In the polycarbonate diol, the carbonic acid diester used as a raw material in the production may remain. The amount of the carbonic acid diester remaining in the polycarbonate diol is not restricted; however, the smaller the amount, the more preferred it is and, in terms of weight ratio with respect to the polycarbonate diol, the upper limit of the amount is preferably 5% by weight, more preferably 3% by weight, still more preferably 1% by weight. When the amount of the carbonic acid diester contained in the polycarbonate diol is excessively large, the carbonic acid diester may interfere with the reaction in polyurethanization. Meanwhile, the lower limit of the amount is not particularly restricted; however, it is preferably 0.1% by weight, more preferably 0.01% by weight, still more preferably 0% by weight. In order to reduce the residual amount of the carbonic acid diester, it is effective to control the pressure during the polymerization reaction of the polycarbonate diol to be a high vacuum of 1 kPa or less in terms of absolute pressure, or to perform thin-film distillation and the like after the polymerization of the polycarbonate diol.

In the polycarbonate diol, the diol compound used in the production may remain as well. The amount of a dihydroxy compound remaining in the polycarbonate diol is not restricted; however, the smaller the amount, the more preferred it is and, in terms of weight ratio with respect to the polycarbonate diol, the amount is preferably 1% by weight or less, more preferably 0.1% by weight or less, still more preferably 0.05° by weight or less. When the amount of the diol compound remaining in the polycarbonate diol is large, the molecular length of soft segment moieties of a polyurethane produced using the polycarbonate diol may be insufficient, and the desired physical properties are thus not attained in some cases. In order to reduce the residual amount of the diol compound, it is effective to control the pressure during the polymerization reaction of the polycarbonate diol to be a high vacuum of 1 kPa or less in terms of absolute pressure, or to perform thin-film distillation and the like after the polymerization of the polycarbonate diol.

In the polycarbonate diol, a cyclic carbonate (cyclic oligomer) generated as a by-product during the production may be contained. For example, when the compound represented by Formula (C) is used, 5,5-dialkyl-1,3-dioxan-2-one, a cyclic carbonate formed by two or more molecules thereof, or the like may be generated and incorporated into the polycarbonate diol. These compounds can induce a side reaction in the polyurethanization reaction and cause turbidity; therefore, it is preferred to remove them as much as possible by controlling the pressure in the polymerization reaction of the polycarbonate diol to be a high vacuum of 1 kPa or less in terms of absolute pressure, or by performing thin-film distillation and the like after the synthesis of the polycarbonate diol. The amount of such a cyclic carbonate contained in the polycarbonate diol is not restricted; however, in terms of weight ratio with respect to the polycarbonate diol, the amount is preferably 3% by weight or less, more preferably 1% by weight or less, still more preferably 0.5% by weight or less.

<1-11. Amount of Heat of Fusion>

The amount of heat of fusion at the melting peak of the polycarbonate diol according to one aspect of the present invention, which is measured using a differential scanning calorimeter, is not less than 0.1 J/g, preferably not less than 0.2 J/g, more preferably not less than 0.3 J/g, but 10 J/g or less, preferably 9 J/g or less, more preferably 8 J/g or less, still more preferably 7 J/g or less. When the amount of heat of fusion is less than the lower limit, the physical properties of a polyurethane produced using the polycarbonate diol, such as chemical resistance and heat resistance, may be poor due to a low crystallinity of the polycarbonate diol, whereas when the amount of heat of fusion is greater than the upper limit, a high crystallinity of the polycarbonate diol may lead to poor storage stability of a polyurethane solution when the polycarbonate diol is processed into a polyurethane.

[2. Polyurethane]

A polyurethane can be produced using the above-described polycarbonate diol according to one aspect of the present invention. Further, a polyurethane can also be produced using the above-described polycarbonate diol-containing composition according to another aspect of the present invention. The resulting polyurethanes are other aspects of the present invention.

With regard to a method of producing a polyurethane using the polycarbonate diol or a polycarbonate diol-containing composition, those polyurethanization reaction conditions known for the polyurethane production are usually employed.

For example, a polyurethane can be produced by allowing the polycarbonate diol to react with a polyisocyanate and a chain extender in a range of normal temperature to 200° C.

Alternatively, a polyurethane can be produced by first allowing the polycarbonate diol to react with an excess amount of a polyisocyanate so as to produce a prepolymer having isocyanate groups at terminals, and subsequently further increasing the polymerization degree using a chain extender.

<2-1. Polyisocyanate>

Examples of the polyisocyanate used in the polyurethane production along with the polycarbonate diol include a variety of known aliphatic, alicyclic or aromatic polyisocyanate compounds.

Examples thereof include aliphatic diisocyanates, such as tetramethylene diisocyanate, pentamethylene diisocyanate, hexamethylene diisocyanate, 2,2,4-trimethylhexamethylene diisocyanate, 2,4,4-trimethylhexamethylene diisocyanate, lysine diisocyanate, and dimer diisocyanate obtained by converting carboxyl groups of a dimer acid into isocyanate groups; alicyclic diisocyanates, such as 1,4-cyclohexane diisocyanate, isophorone diisocyanate, 1-methyl-2,4-cyclohexane diisocyanate, 1-methyl-2,6-cyclohexane diisocyanate, 4,4'-dicyclohexylmethane diisocyanate, 1,3-bis(isocyanatomethyl)cyclohexane, and 1,4-bis(isocyanatomethyl)cyclohexane; and aromatic diisocyanates, such as xylylene diisocyanate, 4,4'-diphenyl diisocyanate, 2,4-tolylene diisocyanate, 2,6-tolylene diisocyanate, m-phenylene diisocyanate, p-phenylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,5-naphthylene diisocyanate, 3,3'-dimethyl-4,4'-biphenylene diisocyanate, polymethylene polyphenylisocyanate, phenylene diisocyanate, and m-tetramethylxylylene diisocyanate. These compounds may be used singly, or in combination of two or more thereof.

Thereamong, 4,4'-diphenylmethane diisocyanate, hexamethylene diisocyanate, 4,4'-dicyclohexylmethane diisocyanate, and isophorone diisocyanate are preferred since these diisocyanates allow the resulting polyurethane to have a good balance of physical properties and are industrially and inexpensively available in large amounts.

<2-2. Chain Extender>

The chain extender used in the polyurethane production is a low-molecular-weight compound which has at least two active hydrogens reacting with isocyanate groups in the production of the below-described isocyanate group-containing prepolymer, and the chain extender is usually, for example, a polyol or a polyamine.

Specific examples thereof include linear diols, such as ethylene glycol, 1,3-propanediol, 1,4-butanediol, 1,5-pentanediol, 1,6-hexanediol, 1,8-octanediol, 1,9-nonanediol, 1,10-decanediol, and 1,12-dodecanediol; branched chain-containing diols, such as 2-methyl-1,3-propanediol, 2,2-dimethyl-1,3-propanediol, 2,2-diethyl-1,3-propanediol, 2-methyl-2-propyl-1,3-propanediol, 2-methyl-1,4-butanediol, 1,2-butanediol, 2,4-heptanediol, 1,4-dimethylolhexane, 2-ethyl-1,3-hexanediol, 2,2,4-trimethyl-1,3-pentanediol, 2-methyl-1,8-octanediol, 2-butyl-2-ethyl-1,3-propanediol, and dimer diol; ether group-containing diols, such as diethylene glycol and propylene glycol; diols having an alicyclic structure, such as 1,4-cyclohexanediol, 1,4-cyclohexanedimethanol, and 1,4-dihydroxyethylcyclohexane; aromatic group-containing diols, such as xylylene glycol, 1,4-dihydroxyethylbenzene, and 4,4'-methylene-bis(hydroxyethylbenzene); polyols, such as glycerin, trimethylolpropane, and pentaerythritol; hydroxyamines, such as N-methylethanolamine and N-ethylethanolamine; polyamines, such as ethylene diamine, 1,3-diaminopropane, hexamethylene diamine, triethylene tetramine, diethylene triamine, isophorone diamine, 4,4'-diaminodicyclohexylmethane, 2-hydroxyethylpropylene diamine, di-2-hydroxyethylethylene diamine, di-2-hydroxy ethylpropylene diamine, 2-hydroxypropylethylene diamine, di-2-hydroxypropylethylene diamine, 4,4'-diphenylmethane diamine, methylene-bis(o-chloroaniline), xylylene diamine, diphenyl diamine, tolylene diamine, hydrazine, piperazine, and N,N'-diaminopiperazine; and water.

These chain extenders may be used singly, or in combination of two or more thereof. Thereamong, 1,4-butanediol, 1,5-pentanediol, 1,6-hexanediol, 1,8-octanediol, 1,9-nonanediol, 1,10-decanediol, 1,4-cyclohexanedimethanol, 1,4-dihydroxyethylcyclohexane, ethylenediamine, 1,3-diaminopropane, isophorone diamine, and 4,4'-diaminodicyclohexylmethane are preferred since these chain extenders allow the resulting polyurethane to have a good balance of physical properties and are industrially and inexpensively available in large amounts.

Further, the chain extender used in the production of the below-described hydroxy group-containing prepolymer is a low-molecular-weight compound having at least two isocyanate groups, and specific examples thereof include those compounds exemplified above in <2-1. Polyisocyanate>.

<2-3. Chain Terminator>

In the polyurethane production, a chain terminator having one active hydrogen group may be used as required for the purpose of controlling the molecular weight of the resulting polyurethane.

Examples of the chain terminator include aliphatic monools having one hydroxy group, such as methanol, ethanol, propanol, butanol, and hexanol; and aliphatic monoamines having one amino group, such as diethylamine, dibutylamine, n-butylamine, monoethanolamine, diethanolamine, and morpholine.

These chain terminators may be used singly, or in combination of two or more thereof.

<2-4. Catalyst>

In a polyurethane-forming reaction performed in the polyurethane production, a known urethane polymerization catalyst may be used, and representative examples thereof include amine-based catalysts, such as triethylamine, N-ethylmorpholine, and triethylenediamine; acid-based catalysts, such as acetic acid, phosphoric acid, sulfuric acid, hydrochloric acid, and sulfonic acid; and organic metal salts, for example, tin-based compounds, such as trimethyl tin laurate, dibutyl tin dilaurate, dioctyl tin dilaurate and dioctyl tin dineodecanoate, and titanium-based compounds. These urethane polymerization catalysts may be used singly, or in combination of two or more thereof.

<2-5. Polyol Other than Polycarbonate Diol According to One Aspect of Present Invention>

In the polyurethane-forming reaction performed in the polyurethane production, the polycarbonate diol according to one aspect of the present invention may be used in combination with a polyol other than the polycarbonate diol (hereinafter, may be referred to as "other polyol") as required.

It is noted here that this other polyol is not particularly restricted as long as it is usually used in the production of a polyurethane, and examples thereof include polyether polyols, polyester polyols, polycaprolactone polyols, and polycarbonate polyols other than the polycarbonate diol according to one aspect of the present invention. For example, when a polyether polyol is used in combination, a polyurethane having a further improved flexibility, which is a characteristic feature of the polycarbonate diol, can be obtained.

The weight ratio of the polycarbonate diol with respect to a total weight of the polycarbonate diol and other polyol is preferably 70% or higher, more preferably 90% or higher. When the weight ratio of the polycarbonate diol is small, the strength and the ease of handling of the resulting polyurethane, which are characteristics of the present invention, may be lost.

<2-6. Modification of Polycarbonate Diol>

In the present invention, the polycarbonate diol according to one aspect of the present invention may be modified and then used for the polyurethane production. Examples of a method of modifying the polycarbonate diol include a method of introducing an ether group to the polycarbonate diol by an addition of an epoxy compound, such as ethylene oxide, propylene oxide or butylene oxide; and a method of introducing an ester group by allowing the polycarbonate diol to react with a cyclic lactone such as ε-caprolactone, a dicarboxylic acid compound such as adipic acid, succinic acid, sebacic acid or terephthalic acid, and an ester compound thereof. In ether modification, the modification with ethylene oxide, propylene oxide or the like is preferred since it reduces the viscosity of the polycarbonate diol, and the ease of handling and the like are thereby improved. Particularly, the modification of the polycarbonate diol of the present invention with ethylene oxide or propylene oxide leads to a reduction in the crystallinity of the polycarbonate diol and an improvement in the flexibility at low temperatures and, in the case of the modification with ethylene oxide, since the water absorption and the moisture permeability of a polyurethane produced using the ethylene oxide-modified polycarbonate diol are enhanced, the performance of the polyurethane as an artificial leather, a synthetic leather or the like may be improved. However, when the amount of added ethylene oxide or propylene oxide is large, various physical properties of the polyurethane produced using the modified polycarbonate diol, such as mechanical strength, heat resistance and solvent resistance, are deteriorated;

therefore, the amount of ethylene oxide or propylene oxide added to the polycarbonate diol is suitably 5 to 50% by weight, preferably 5 to 40% by weight, more preferably 5 to 30% by weight, with respect to the weight of the polycarbonate diol. Moreover, as for the method of introducing an ester group, the modification with ε-caprolactone is preferred since it reduces the viscosity of the polycarbonate diol, and the ease of handling and the like are thereby improved. The amount of ε-caprolactone added to the polycarbonate diol is suitably 5 to 50% by weight, preferably 5 to 40% by weight, more preferably 5 to 30% by weight, with respect to the weight of the polycarbonate diol. When the amount of added ε-caprolactone is greater than 50% by weight, the hydrolysis resistance, the chemical resistance and the like of the polyurethane produced using the modified polycarbonate diol are reduced.

<2-7. Solvent>

In the polyurethane-forming reaction performed in the polyurethane production, a solvent may be used as well.

Examples of a preferred solvent include amide-based solvents, such as dimethylformamide, diethylformamide, dimethylacetamide, and N-methylpyrrolidone; sulfoxide-based solvents, such as dimethyl sulfoxide; ketone-based solvents, such as methyl ethyl ketone, cyclohexanone, and methyl isobutyl ketone; ether-based solvents, such as tetrahydrofuran and dioxane; ester-based solvents, such as methyl acetate, ethyl acetate, and butyl acetate; and aromatic hydrocarbon-based solvents, such as toluene and xylene. Any of these solvents may be used singly, or two or more thereof may be used as a mixed solvent.

Thereamong, preferred organic solvents are, for example, dimethylacetamide, N-methylpyrrolidone, dimethyl sulfoxide, methyl ethyl ketone, ethyl acetate, and toluene.

Further, a polyurethane in the form of an aqueous dispersion can be produced from a polyurethane composition in which the polycarbonate diol according to one aspect of the present invention, a polydiisocyanate and the above-described chain extender are blended.

<2-8. Method of Producing Polyurethane>

As a method of producing a polyurethane using the above-described reagents, any production method that is used experimentally or industrially in general can be employed.

Examples thereof include a method in which the polycarbonate diol according to one aspect of the present invention, other polyol, a polyisocyanate and a chain extender are mixed all at once and thereby allowed to react (this method may be hereinafter referred to as "one-step method"); and a method in which the polycarbonate diol according to one aspect of the present invention, other polyol and a polyisocyanate are allowed to react first so as to prepare a prepolymer having an isocyanate group at both terminals, and this prepolymer is subsequently allowed to react with a chain extender (this method may be hereinafter referred to as "two-step method").

The two-step method involves the step of allowing the polycarbonate diol according to one aspect of the present invention and other polyol to react with at least one equivalent of a polyisocyanate in advance so as to prepare an intermediate terminated by isocyanate at both terminals, which is a moiety corresponding to the soft segment of a polyurethane. When a prepolymer is prepared once in this manner and subsequently allowed to react with a chain extender, the molecular weight of the soft segment moiety may be easily adjusted, and this is useful in a case where phase separation of the soft segment and the hard segment needs to be ensured.

<2-9. One-Step Method>

The one-step method, which is also called "one-shot method", is a method of performing a reaction by charging the polycarbonate diol according to one aspect of the present invention, other polyol, a polyisocyanate and a chain extender all at once.

The amount of the polyisocyanate to be used in the one-step method is not particularly restricted; however, when the sum of the total number of hydroxy groups in the polycarbonate diol according to one aspect of the present invention and other polyol and the number of hydroxy groups and amino groups in the chain extender is assumed to be 1 equivalent, the lower limit of the amount of the polyisocyanate is preferably 0.7 equivalents, more preferably 0.8 equivalents, still more preferably 0.9 equivalents, particularly preferably 0.95 equivalents, while the upper limit is preferably 3.0 equivalents, more preferably 2.0 equivalents, still more preferably 1.5 equivalents, particularly preferably 1.1 equivalent.

When the polyisocyanate is used in an excessively large amount, unreacted isocyanate groups induce side reactions, and this tends to make it difficult to handle the resulting polyurethane and impair the flexibility of the polyurethane due to an excessively high viscosity, whereas when the amount of the polyisocyanate is excessively small, since the molecular weight is not sufficiently increased in the resulting polyurethane, the polyurethane tends to have insufficient strength.

The amount of the chain extender to be used is also not particularly restricted; however, when the value obtained by subtracting the number of isocyanate groups in the polyisocyanate from the total number of hydroxy groups in the polycarbonate diol according to one aspect of the present invention and other polyol is assumed to be 1 equivalent, the lower limit of the amount of the chain extender is preferably 0.7 equivalents, more preferably 0.8 equivalents, still more preferably 0.9 equivalents, particularly preferably 0.95 equivalents, while the upper limit is preferably 3.0 equivalents, more preferably 2.0 equivalents, still more preferably 1.5 equivalents, particularly preferably 1.1 equivalents. An excessively large amount of the chain extender tends to make the resulting polyurethane hardly soluble insolvents, thus making the processing of the polyurethane difficult, whereas when the amount of the chain extender is excessively small, since the resulting polyurethane is overly soft, there are cases where sufficient strength, sufficient hardness and sufficient elasticity-recovering and elasticity-retaining performance are not attained, or the heat resistance is deteriorated.

<2-10. Two-Step Method>

The two-step method is also called "prepolymer method", and examples thereof mainly include the following methods:

(a) a method in which a prepolymer having isocyanate groups at molecular chain terminals is prepared in advance by allowing the polycarbonate diol according to one aspect of the present invention and other polyol to react with an excess amount of a polyisocyanate at a reaction equivalent ratio (the polyisocyanate/(the polycarbonate diol according to one aspect of the present invention and other polyol)) of higher than 1 to 10.0, and a chain extender is subsequently added to the prepolymer to produce a polyurethane; and (b) a method in which a prepolymer having hydroxy groups at molecular chain terminals is prepared in advance by allowing a polyisocyanate to react with an excess amount of the polycarbonate diol and other polyol at a reaction equivalent ratio (the polyisocyanate/(the polycarbonate diol according to one aspect of the present invention and other polyol)) of 0.1 to less than 1.0 and, as a chain extender, an isocyanate group-terminated polyisocyanate is subsequently allowed to react with the prepolymer so as to produce a polyurethane.

The two-step method can be carried out in the absence or presence of a solvent.

The polyurethane production based on the two-step method can be performed by any of the following methods (1) to (3):

(1) a method in which a prepolymer is synthesized first by allowing a polyisocyanate, the polycarbonate diol and other polyol to directly react with each other without using a solvent, and the prepolymer is used as is for a chain extension reaction;

(2) a method in which a prepolymer is synthesized in the same manner as in the method (1) and subsequently dissolved in a solvent, and the resultant is used for the subsequent chain extension reaction; and (3) a method in which a polyisocyanate, the polycarbonate diol and other polyol are allowed to react with each other using a solvent from the beginning, followed by a chain extension reaction.

In the case of the method (1), it is important to obtain a polyurethane in the form of coexisting with a solvent by, for example, dissolving the chain extender in the solvent or simultaneously dissolving the prepolymer and the chain extender in the solvent at the time of performing the chain extension reaction.

The amount of the polyisocyanate to be used in the two-step method (a) is not particularly restricted; however, when the total number of hydroxy groups in the polycarbonate diol and other polyol is assumed to be 1 equivalent, the amount of the polyisocyanate in terms of the number of isocyanate groups is in a range where the lower limit is preferably 1.0 equivalent or greater, more preferably 1.2 equivalents, still more preferably 1.5 equivalents, while the upper limit is preferably 10.0 equivalents, more preferably 5.0 equivalents, still more preferably 3.0 equivalents.

When the amount of this isocyanate is excessively large, excess isocyanate groups induce side reactions and this tends to make the resulting polyurethane unlikely to achieve desired physical properties (e.g., an excessive increase in the viscosity tends to reduce the flexibility of the polyurethane, and the productivity tends to be deteriorated due to poor ease of handling), whereas when the amount of the isocyanate is excessively small, since the molecular weight is not sufficiently increased in the resulting polyurethane, the polyurethane may have a low strength and poor thermal stability.

The amount of the chain extender to be used is also not particularly restricted; however, with respect to 1 equivalent of the isocyanate groups contained in the prepolymer, the lower limit of the amount of the chain extender is preferably 0.1 equivalents, more preferably 0.5 equivalents, still more preferably 0.8 equivalents, while the upper limit is preferably 5.0 equivalents, more preferably 3.0 equivalents, still more preferably 2.0 equivalents.

At the time of performing the above-described chain extension reaction, a monofunctional organic amine or an alcohol may be allowed to coexist for the purpose of adjusting the molecular weight.

In the preparation of a hydroxy group-terminated prepolymer in the two-step method (b), the amount of the polyisocyanate to be used is not particularly restricted; however, when the total number of hydroxy groups in the polycarbonate diol and other polyol is assumed to be 1 equivalent, the lower limit of the number of isocyanate groups is preferably 0.1 equivalents, more preferably 0.5 equivalents, still more preferably 0.7 equivalents, while the upper limit is preferably 0.99 equivalents, more preferably 0.98 equivalents, still more preferably 0.97 equivalents.

When the amount of this isocyanate is excessively small, the process until the desired molecular weight is attained in the subsequent chain extension reaction takes a long time and the production efficiency thus tends to be reduced, whereas when the amount is excessively large, an excessive increase in the viscosity may reduce the flexibility of the resulting polyurethane, and the productivity may be deteriorated due to poor ease of handling.

The amount of the chain extender to be used is not particularly restricted; however, when the total number of hydroxy groups in the polycarbonate diol and other polyol used for the prepolymer is assumed to be 1 equivalent, the amount of the chain extender in terms of the total equivalent including the isocyanate groups used for the prepolymer is in a range where the lower limit is preferably 0.7 equivalents, more preferably 0.8 equivalents, still more preferably 0.9 equivalents, while the upper limit is preferably 1.0 equivalent, more preferably 0.99 equivalents, still more preferably 0.98 equivalents.

At the time of performing the above-described chain extension reaction, a monofunctional organic amine or an alcohol may be allowed to coexist for the purpose of adjusting the molecular weight.

The chain extension reaction is usually performed at 0° C. to 250° C.; however, this temperature is not particularly restricted and varies depending on, for example, the amount of the solvent, the reactivity of the raw materials being used, and the reaction equipment. When the temperature is excessively low, the reaction may proceed slowly or the production time may be prolonged due to low solubility of the raw materials or polymerization product, whereas when the temperature is excessively high, a side reaction and decomposition of the resulting polyurethane may occur. The chain extension reaction may be performed while defoaming the resultant under a reduced pressure.

Further, in the chain extension reaction, a catalyst, a stabilizer and the like may also be added as required.

Examples of the catalyst include compounds such as triethylamine, tributylamine, dibutyl tin dilaurate, stannous octoate, acetic acid, phosphoric acid, sulfuric acid, hydrochloric acid and sulfonic acid, and these compounds may be used singly, or in combination of two or more thereof.

Examples of the stabilizer include compounds such as 2,6-dibutyl-4-methylphenol, distearyl thiodipropionate, N,N'-di-2-naphthyl-1,4-phenylenediamine and tris(dinonylphenyl)phosphite, and these compounds may be used singly, or in combination of two or more thereof. It is noted here that, when the chain extender is a highly reactive compound such as a short-chain aliphatic amine, the chain extension reaction may be performed without adding a catalyst.

<2-11. Aqueous Polyurethane Emulsion>

An aqueous polyurethane emulsion can be produced using the polycarbonate diol according to one aspect of the present invention.

In this case, at the time of producing a prepolymer by allowing polyols including the polycarbonate diol and an excess amount of a polyisocyanate to react with each other, the prepolymer is formed while mixing a compound having at least one hydrophilic functional group and at least two isocyanate-reactive groups, and the thus obtained prepolymer is subjected to the step of forming a neutral salt of the hydrophilic functional group, the emulsification step with an addition of water, and the chain extension reaction step, whereby an aqueous polyurethane emulsion is produced.

In the compound having at least one hydrophilic functional group and at least two isocyanate-reactive groups that is used in this case, the "hydrophilic functional group" is, for example, a carboxyl group or a sulfonic acid group that is neutralizable with an alkaline group. Further, the "isocyanate-reactive groups" are groups that generally react with an isocyanate to form a urethane bond or a urea bond, such as a hydroxyl group, a primary amino group and a secondary amino group, and these groups may coexist in the same molecule.

Specific examples of the compound having at least one hydrophilic functional group and at least two isocyanate-reactive groups include 2,2'-dimethylolpropionic acid, 2,2-methylolbutyric acid, 2,2'-dimethylolvaleric acid, and diaminocarboxylic acids such as lysine, cystine, and 3,5-diaminocarboxylic acid. These compounds may be used singly, or in combination of two or more thereof. In the actual use of these compounds, they may be neutralized with an alkaline compound, for example, an amine such as trimethylamine, triethylamine, tri-n-propylamine, tributylamine or triethanolamine, sodium hydroxide, potassium hydroxide, or ammonia.

In the case of producing an aqueous polyurethane emulsion, with regard to the amount to be used of the compound having at least one hydrophilic functional group and at least two isocyanate-reactive groups, the lower limit thereof is, for the purpose of increasing the dispersion performance in water, preferably 1% by weight, more preferably 5% by weight, still more preferably 10% by weight, with respect to the total weight of the polycarbonate diol and other polyol. Meanwhile, when the compound is added in an excessively large amount, the properties of the polycarbonate diol are sometimes not maintained; therefore, the upper limit of the amount is preferably 50% by weight, more preferably 40% by weight, still more preferably 30% by weight.

In the case of producing an aqueous polyurethane emulsion, the reaction in the prepolymer-forming step may be performed in the presence of a solvent, such as methyl ethyl ketone, acetone or N-methyl-2-pyrrolidone, or in the absence of a solvent. When a solvent is used, it is preferred to remove the solvent by distillation after the production of the aqueous emulsion.

In the production of an aqueous polyurethane emulsion using the polycarbonate diol as a raw material in the absence of a solvent, the upper limit of the number-average molecular weight of the polycarbonate diol, which is determined from the hydroxyl value, is preferably 5,000, more preferably 4,500, still more preferably 4,000. Meanwhile, the lower limit of the number-average molecular weight is preferably 300, more preferably 500, still more preferably 800. When the number-average molecular weight determined from the hydroxyl value is higher than the upper limit or less than the lower limit, it may be difficult to perform the emulsification.

For the synthesis or storage of the aqueous polyurethane emulsion, the emulsification stability may be maintained by using in combination, for example, an anionic surfactant typified by higher fatty acids, resin acids, acidic fatty alcohols, sulfuric acid esters, higher alkyl sulfonates, alkylaryl sulfonates, sulfonated castor oil, and sulfosuccinic acid esters; a cationic surfactant, such as a primary amine salt, a secondary amine salt, a tertiary amine salt, a quaternary amine salt, or a pyridinium salt; or a nonionic surfactant typified by known reaction products of ethylene oxide with a long-chain fatty alcohol or a phenol.

In the production of an aqueous polyurethane emulsion, an emulsion can also be produced by, as required, mixing an organic solvent solution of the prepolymer with water under high mechanical shear in the presence of an emulsifier, without the neutral salt-forming step.

The aqueous polyurethane emulsion produced in this manner can be used in various applications. Particularly, a chemical raw material having a small environmental load is demanded recently, and the aqueous polyurethane emulsion can be an alternative to conventional products, aiming at no use of an organic solvent.

With regard to the specific use of the aqueous polyurethane emulsion, for example, the aqueous polyurethane emulsion is suitably utilized for coating agents, aqueous paints, adhesives, synthetic leathers, and artificial leathers. Particularly, an aqueous polyurethane emulsion produced using the polycarbonate diol according to one aspect of the present invention contains a structural unit derived from the compound represented by Formula (B) in the polycarbonate diol and, therefore, it is flexible and can thus be more effectively utilized as a coating agent or the like as compared to an aqueous polyurethane emulsion in which a conventional polycarbonate diol is used.

<2-12. Storage Stability of Polyurethane Solution and Aqueous Polyurethane Emulsion>

The storage stability of a polyurethane solution or aqueous polyurethane emulsion produced using the polycarbonate diol according to one aspect of the present invention along with an organic solvent and/or water can be determined by adjusting the polyurethane concentration (hereinafter, may be referred to as "solid concentration") in the solution or the emulsion to be 1 to 80% by weight, storing the solution or the emulsion under a specific temperature condition, and then visually checking the presence or absence of a change in the solution or the emulsion. For example, in the case of a polyurethane solution (N,N-dimethylformamide/toluene mixed solution, solid concentration: 30% by weight) produced by the above-described two-step method using the polycarbonate diol according to one aspect of the present invention with 4,4'-dicyclohexylmethane diisocyanate and isophorone diamine, the period in which, after storage at 10° C., a change in the polyurethane solution is not visually observed is preferably one month, more preferably three months or longer, still more preferably six months or longer.

<2-13. Additives>

In the polyurethane produced using the polycarbonate diol, a variety of additives, such as a thermal stabilizer, a light stabilizer, a coloring agent, a bulking agent, a stabilizer, a UV absorber, an antioxidant, an adhesion inhibitor, a flame retardant, an age resistor and an inorganic filler, can be added and mixed within a range that does not impair the properties of the polyurethane.

Examples of a compound that can be used as the thermal stabilizer include phosphorus compounds, such as aliphatic, aromatic or alkyl group-substituted aromatic esters of phosphoric acid or phosphorous acid, hypophosphorous acid derivatives, phenylphosphonic acid, phenylphosphinic acid, diphenylphosphonic acid, polyphosphonates, dialkylpentaerythritol diphosphite, and dialkyl bisphenol-A diphosphite; phenolic derivatives, particularly hindered phenol compounds; sulfur-containing compounds, such as thioether-based, dithioate-based, mercaptobenzimidazole-based, thiocarbanilide-based and thiodipropionic acid ester-based compounds; and tin-based compounds, such as tin maleate and dibutyl tin monoxide.

Specific examples of the hindered phenol compounds include "IRGANOX 1010" (trade name: manufactured by BASF Japan, Ltd.), "IRGANOX 1520" (trade name: manufactured by BASF Japan, Ltd.), and "IRGANOX 245" (trade name: manufactured by BASF Japan, Ltd.).

Examples of the phosphorus compounds include "PEP-36", "PEP-24G" and "HP-10" (trade names: all of which are manufactured by ADEKA Corporation), and "IRGAFOS 168" (trade name: manufactured by BASF Japan, Ltd.).

Specific examples of the sulfur-containing compounds include thioether compounds, such as dilauryl thiopropionate (DLTP) and distearyl thiopropionate (DSTP).

Examples of the light stabilizer include benzotriazole-based and benzophenone-based compounds and, specifically, for example, "TINUVIN 622LD" and "TINUVIN 765" (which are manufactured by Ciba Specialty Chemicals Holding Inc.) as well as "SANOL LS-2626" and "SANOL LS-765" (which are manufactured by Sankyo Co., Ltd.) can be used.

Examples of the UV absorber include "TINUVIN 328" and "TINUVIN 234" (which are manufactured by Ciba Specialty Chemicals Holding Inc.).

Examples of the coloring agent include dyes, such as direct dyes, acid dyes, basic dyes, and metal complex salt dyes; inorganic pigments, such as carbon black, titanium oxide, zinc oxide, iron oxide, and mica; and organic pigments, such as coupling azo-based, condensed azo-based, anthraquinone-based, thioindigo-based, dioxazone-based and phthalocyanine-based pigments.

Examples of the inorganic filler include short glass fibers, carbon fibers, alumina, talc, graphite, melamine, and white clay.

Examples of the flame retardant include organic compounds containing phosphorus and halogen, organic compounds containing bromine or chlorine, and additive-type and reactive-type flame retardants, such as ammonium polyphosphate, aluminum hydroxide, and antimony oxide.

Any of the above-described additives may be used singly, or two or more thereof may be used in any combination at any ratio.

As for the amount of these additives to be added in terms of weight ratio with respect to the polyurethane, the lower limit is preferably 0.01% by weight, more preferably 0.05% by weight, still more preferably 0.1° by weight, while the upper limit is preferably 10% by weight, more preferably 5% by weight, still more preferably 1% by weight. When the amount of the additives is excessively small, the effect of the addition cannot be sufficiently obtained, whereas when the amount is excessively large, the additives may precipitate in the polyurethane or cause turbidity.

<2-14. Polyurethane Film and Polyurethane Plate>

In the case of producing a film using the polyurethane, the lower limit of the film thickness is preferably 10 μm, more preferably 20 μm, still more preferably 30 μm, while the upper limit is preferably 1,000 μm, more preferably 500 μm, still more preferably 100 μm.

When the film is excessively thick, sufficient moisture permeability is unlikely to be attained, whereas an excessively small thickness tends to result in the formation of pinholes, and blocking is likely to occur in such a film, making the handling of the film difficult.

<2-15. Molecular Weight>

The molecular weight of the polyurethane is adjusted as appropriate in accordance with the intended used and is not particularly restricted; however, the weight-average molecular weight (Mw) in terms of polystyrene, which is determined by GPC, is preferably 50,000 to 500,000, more preferably 100,000 to 300,000. When the Mw is less than the lower limit, sufficient strength and hardness are sometimes not attained, whereas when the Mw is higher than the upper limit, the ease of handling such as processability tends to be deteriorated.

<2-16. Room-Temperature Tensile Test>

<2-16-1. Tensile Elongation at Break and Strength in Room-Temperature Tensile Test>

The tensile elongation at break and the breaking strength of the polyurethane, which are measured for a strip-form sample of 10 mm in width, 100 mm in length and about 50 to 100 μm in thickness under the conditions of a temperature of 23° C. and a relative humidity of 50% at a chuck distance of 50 mm and a tensile rate of 500 mm/min, are preferably in the following respective ranges.

The lower limit of the elongation at break is preferably 200%, more preferably 300%, still more preferably 350%, while the upper limit is preferably 1,000%, more preferably 800%, still more preferably 600%. When the elongation at break is less than the lower limit, the ease of handling such as processability tends to be deteriorated, whereas when the elongation at break is higher than the upper limit, sufficient solvent resistance is not attained in some cases.

Further, the lower limit of the breaking strength is preferably 30 MPa, more preferably 40 MPa, still more preferably 50 MPa, while the upper limit is preferably 200 MPa, more preferably 100 MPa, still more preferably 80 MPa. When the breaking strength is less than the lower limit, the ease of handling such as processability tends to be deteriorated, whereas when the breaking strength is higher than the upper limit, the flexibility may be deteriorated.

<2-16-2. 100% Modulus and 300% Modulus in Room-Temperature Tensile Test>

When a polyurethane is obtained by a two-step method where the polycarbonate diol according to one aspect of the present invention is allowed to react with 2 equivalents of 4,4'-dicyclohexylmethane diisocyanate and a chain extension reaction of the resultant is further performed with isophorone diamine, the lower limit of the 100% modulus measured for a strip-form sample of 10 mm in width, 100 mm in length and about 50 to 100 μm in thickness under the conditions of a temperature of 23° C. and a relative humidity of 60% at a chuck distance of 50 mm and a tensile rate of 500 mm/min is preferably 3.0 MPa, more preferably 4.0 MPa, still more preferably 5.0 MPa, while the upper limit is preferably 20 MPa, more preferably 10 MPa, still more preferably 8 MPa. When the 100% modulus is less than the lower limit, the hardness may be insufficient, whereas when the 100% modulus is higher than the upper limit, the flexibility may be insufficient, and the ease of handling such as processability tends to be deteriorated. Moreover, the lower limit of the 300% modulus of the polyurethane is preferably 10 MPa, more preferably 15 MPa, still more preferably 20 MPa, while the upper limit is preferably 100 MPa, more preferably 50 MPa, still more preferably 40 MPa. When the 300% modulus is less than the lower limit, the hardness may be insufficient, whereas when the 300% modulus is higher than the upper limit, the flexibility may be insufficient, and the ease of handling such as processability tends to be deteriorated.

<2-17. 100% Modulus and 300% Modulus in Low-Temperature Tensile Test>

When a polyurethane is obtained by a two-step method where the polycarbonate diol according to one aspect of the present invention is allowed to react with 2 equivalents of 4,4'-dicyclohexylmethane diisocyanate and a chain extension reaction of the resultant is further performed with isophorone diamine, the lower limit of the 100% modulus measured for a strip-form sample of 10 mm in width, 100 mm in length and about 50 to 100 μm in thickness at a chuck distance of 50 mm, a tensile rate of 500 mm/min and a temperature of −10° C. is preferably 5 MPa, more preferably 10 MPa, still more preferably 15 MPa, while the upper limit is preferably 20 MPa, more preferably 19 MPa, still more preferably 18 MPa. When the 100% modulus is less than the lower limit, the hardness may be insufficient, whereas when the 100% modulus is higher than the upper limit, the flexibility may be insufficient, and the ease of handling such as processability tends to be deteriorated.

<2-18. Solvent Resistance>
<2-18-1. Oleic Acid Resistance>

In the evaluation of the polyurethane by, for example, the method described below in the section of Examples, the rate of change (%) in the weight of a polyurethane test piece after immersion in oleic acid with respect to the weight of the polyurethane test piece before immersion in oleic acid is preferably 40% or lower, more preferably 30% or lower, still more preferably 25% or lower, particularly preferably 20% or lower, most preferably 18% or lower.

When this weight change rate is higher than the upper limit, sufficient oleic acid resistance cannot be attained in some cases.

<2-18-2. Ethanol Resistance>

In the evaluation of the polyurethane by, for example, the method described below in the section of Examples, the rate of change (%) in the weight of a polyurethane test piece after immersion in ethanol with respect to the weight of the polyurethane test piece before immersion in ethanol is preferably 40% or lower, more preferably 30% or lower, still more preferably 25% or lower, particularly preferably 20% or lower, most preferably 18% or lower.

When this weight change rate is higher than the upper limit, sufficient ethanol resistance cannot be attained in some cases.

<2-18-3. Ethyl Acetate Resistance>

In the evaluation of the polyurethane by, for example, the method described below in the section of Examples, the rate of change (%) in the weight of a polyurethane test piece after immersion in ethyl acetate with respect to the weight of the polyurethane test piece before immersion in ethyl acetate is preferably 150% or lower, more preferably 100% or lower, still more preferably 90% or lower.

When this weight change rate is higher than the upper limit, sufficient ethyl acetate resistance cannot be attained in some cases.

<2-19. Use>

The polyurethane has excellent solvent resistance and good flexibility and mechanical strength and, therefore, can be widely used for, for example, foams, elastomers, elastic fibers, paints, fibers, pressure-sensitive adhesives, adhesives, floor materials, sealants, medical materials, artificial leathers, synthetic leathers, coating agents, aqueous polyurethane paints, and active energy ray-curable polymer compositions.

Particularly, when the polyurethane according to one aspect of the present invention is used in applications such as artificial leathers, synthetic leathers, aqueous polyurethanes, adhesives, elastic fibers, medical materials, floor materials, paints and coating agents, since the polyurethane has a good balance of solvent resistance, flexibility and mechanical strength, the polyurethane can impart favorable characteristics, such as high durability, sufficient flexibility and excellent strength against physical impact and the like, to those parts which come into contact with human skin or where a cosmetic preparation or a rubbing alcohol is used. Moreover, the polyurethane can be suitably used in automobile applications such as automobile members where heat resistance is required, as well as outdoor applications where weather resistance is required.

The polyurethane can be used in thermosetting elastomers and cast polyurethane elastomers. Specific applications thereof include rolls, such as press-rolling rolls, papermaking rolls, office equipment, and pre-tension rolls; solid tires and casters of fork lifts, motor vehicle new trams, wheeled carriers, trucks and the like; and industrial products, such as conveyor belt idlers, guide rolls, pulleys, steel pipe linings, ore rubber screens, gears, connection rings, liners, pump impellers, cyclone cones, and cyclone liners. In addition, the polyurethane can also be used in belts of OA devices, paper feed rolls, copier cleaning blades, snowplows, toothed belts, surf rollers, and the like.

The polyurethane is also applied as a thermoplastic elastomer. The polyurethane can be used for, for example, tubes and hoses in pneumatic instruments employed in the food and medical fields, coating apparatuses, analytical instruments, physicochemical instruments, metering pumps, water treatment apparatuses and industrial robots, as well as spiral tubes and fire hoses. The polyurethane can also be used as a belt, such as a round belt, a V-belt or a flat belt, in various transmission mechanisms, spinning machines, packaging machines, printing machines, and the like. Further, the polyurethane can be used in footwear heel tops, shoe soles, machine components (e.g., couplings, packings, ball joints, bushes, gears, and roll), sporting goods, leisure goods, watchbands, and the like. Moreover, the polyurethane can be used in automobile components, such as oil stoppers, gearboxes, spacers, chassis parts, interior trims, and tire chain substitutes. Furthermore, the polyurethane can be used in films, such as keyboard films and automotive films, curl codes, cable sheaths, bellows, conveyor belts, flexible containers, binders, synthetic leathers, dipping products, adhesives, and the like.

The polyurethane is also applicable to the use as a solvent-based two-component paint and may be applied to wood products, such as musical instruments, family altars, furniture, decorative plywoods, and sporting equipment. In addition, the polyurethane can be used as a tar-epoxy urethane for automobile repair.

The polyurethane can be used as a component of, for example, moisture-curable one-component paints, blocked isocyanate-based solvent paints, alkyd resin paints, urethane-modified synthetic resin paints, UV-curable paints and aqueous urethane paints, and can be applied to, for example, paints for plastic bumpers; strippable paints; coating agents for magnetic tapes; over-print varnishes of floor tiles, floor materials, papers, wood-grain printed films and the like; varnishes for wood materials; high-processing coil coatings; optical fiber protective coatings; solder resists; topcoats for metal printing; basecoats for vapor deposition; and whitecoats for food cans.

Further, the polyurethane can be applied as a pressure-sensitive adhesive or an adhesive for food packagings, shoes, footwear, magnetic tape binders, decorative papers, wood materials, structural members and the like, and can also be used as a component of low-temperature adhesives and hot-melts.

The polyurethane can be used as a binder in, for example, magnetic recording media, inks, castings, fired bricks, graft materials, microcapsules, granular fertilizers, granular agricultural chemicals, polymer cement mortars, resin mortars, rubber chip binders, recycled foams, and glass fiber sizings.

The polyurethane can also be used as a component of a fiber-processing agent for shrink proofing, crease proofing, water repellent finishing, and the like.

In the case of using the polyurethane as an elastic fiber, fibrillization thereof can be performed by any method with no particular restriction as long as the method is capable of spinning the polyurethane. For example, a melt-spinning method in which the polyurethane is made into a pellet once and this pellet is subsequently melted and spun directly through a spinneret may be employed. When the elastic fiber is obtained from the polyurethane by melt-spinning, the spinning temperature is preferably 250° C. or lower, more preferably 200° C. to 235° C.

The polyurethane elastic fiber can be used directly as a bare fiber, or may be coated with other fiber and used as a coated fiber. Examples of such other fiber include conventionally known fibers, such as polyamide fibers, wool, cotton and polyester fibers, among which a polyester fiber is preferably used in the present invention. Further, the elastic fiber using the polyurethane may contain a dyeing-type disperse dye as well.

The polyurethane can be used as a sealant or caulking for, for example, concrete walls, control joints, sash peripheries, wall-type PC (precast concrete) joints, ALC (autoclaved light-weight concrete) joints, board joints, composite glass sealants, heat-insulating sash sealants, and automotive sealants.

The polyurethane can be used as a medical material and may be used as a blood compatible material for tubes, catheters, artificial hearts, artificial blood vessels, artificial valves and the like, or as a disposable material for catheters, tubes, bags, surgical gloves, artificial kidney potting materials and the like.

The polyurethane, through modification of its terminals, can also be used as a raw material for, for example, UV-curable paints, electron beam-curable paints, photosensitive resin compositions for flexographic printing plates, and photocurable coating compositions for optical fibers.

<2-20. Urethane (Meth)acrylate-Based Oligomer>

A urethane (meth)acrylate-based oligomer can be produced by an addition reaction of a polyisocyanate and a hydroxyalkyl (meth)acrylate using the polycarbonate diol. When a polyol, a chain extender and the like are used in combination as other raw material compounds, a urethane (meth)acrylate-based oligomer can be produced by further adding such other raw material compounds to the polyisocyanate through reaction.

It is noted here that, in the present invention, the term "(meth)acryl" as in "(meth)acrylate" and "(meth)acrylic acid" means acryl and/or methacryl.

In this process, the ratio of each raw material compound to be added is substantially equal to or the same as that in the composition of the desired urethane (meth)acrylate-based oligomer.

The amount of all isocyanate groups in the resulting urethane (meth)acrylate-based oligomer and the amount of all functional groups reacting with the isocyanate groups, such as hydroxy groups and amino groups, are normally equimolar in theory.

In the production of the urethane (meth)acrylate-based oligomer, the amount of the hydroxyalkyl (meth)acrylate to be used is usually not less than 10% by mole, preferably not less than 15% by mole, still more preferably not less than 25% by mole, but usually 70% by mole or less, preferably 50% by mole or less, with respect to the total amount of the hydroxyalkyl (meth)acrylate, the polycarbonate diol, and a polyol and a compound containing a functional group reacting with isocyanate, such as a chain extender, which are used as other raw material compounds as required. The molecular weight of the resulting urethane (meth)acrylate-based oligomer can be controlled in accordance with this ratio. When the ratio of the hydroxyalkyl (meth)acrylate is high, the molecular weight of the urethane (meth)acrylate-based oligomer tends to be small, whereas when the ratio is low, the molecular weight tends to be large.

The amount of the polycarbonate diol according to one aspect of the present invention to be used is preferably not less than 25% by mole, more preferably not less than 50% by mole, still more preferably not less than 70% by mole, with respect to the total amount of the polycarbonate diol and other polyol. When the polycarbonate dial is used in an amount of not less than the above-described lower limit value, the resulting cured product tends to have favorable elongation, hardness, weather resistance and contamination resistance, which is preferred.

Further, the amount of the polycarbonate diol according to one aspect of the present invention to be used is preferably not less than 10% by weight, more preferably not less than 30% by weight, still more preferably not less than 50% by weight, particularly preferably not less than 70% by weight, with respect to the total amount of the polycarbonate diol and other polyol. When the polycarbonate diol is used in an amount of not less than the above-described lower limit value, not only the viscosity of the resulting composition is reduced and the workability is thus improved, but also the mechanical strength, hardness and abrasion resistance of the resulting cured product tend to be improved as well, which are preferred.

Moreover, when a chain extender is used, the total amount of the polycarbonate diol according to one aspect of the present invention and other polyol to be used is preferably not less than 70% by mole, more preferably not less than 80% by mole, still more preferably not less than 90% by mole, particularly preferably not less than 95% by mole, with respect to the total amount of the polycarbonate diol and other polyol in combination with the chain extender. When the polycarbonate diol according to one aspect of the present invention and other polyol are used in an amount of greater than the above-described lower limit value, the liquid stability tends to be improved, which is preferred.

In the production of the urethane (meth)acrylate-based oligomer, a solvent can be used for the purpose of adjusting the viscosity. A solvent may be used singly, or two or more solvents may be used in combination. As the solvent, any known solvent can be used. Examples of a preferred solvent include toluene, xylene, ethyl acetate, butyl acetate, cyclohexanone, methyl ethyl ketone, and methyl isobutyl ketone. The solvent can be usually used in an amount of less than 300 parts by weight with respect to 100 parts by weight of solid components in the reaction system.

In the production of the urethane (meth)acrylate-based oligomer, the total content of the urethane (meth)acrylate-based oligomer to be produced and the raw material compounds thereof is preferably not less than 20% by weight, more preferably not less than 40% by weight, with respect to the total amount of components in the reaction system. The upper limit of this total content is 100% by weight. When the total content of the urethane (meth)acrylate-based oligomer and the raw material compounds thereof is 20% by weight or greater, the reaction rate is increased and the production efficiency thus tends to be improved, which is preferred.

In the production of the urethane (meth)acrylate-based oligomer, an addition reaction catalyst can be used.

Examples of the addition reaction catalyst include dibutyl tin laurate, dibutyl tin dioctoate, dioctyl tin dilaurate, and dioctyl tin dioctoate. These addition reaction catalysts may be used singly, or in combination of two or more thereof. Thereamong, the addition reaction catalyst is preferably dioctyl tin dilaurate from the standpoints of the environmental adaptability, the catalytic activity, and the storage stability.

As for the amount of the addition reaction catalyst to be used, the upper limit thereof is usually 1,000 ppm by weight, preferably 500 ppm by weight, while the lower limit is usually 10 ppm by weight, preferably 30 ppm by weight, with respect to the total content of the urethane (meth)acrylate-based oligomer to be produced and the raw material compounds thereof.

Further, in the production of the urethane (meth)acrylate-based oligomer, when the reaction system contains a (meth)acryloyl group, a polymerization inhibitor can be used in combination. Examples of the polymerization inhibitor include phenols, such as hydroquinone, methylhydroquinone, hydroquinone monoethyl ether, and dibutylhydroxytoluene; amines, such as phenothiazine and diphenylamine; copper salts, such as copper dibutyldithiocarbamate; manganese salts, such as manganese acetate; nitro compounds; and nitroso compounds. These polymerization inhibitors may be used singly, or in combination of two or more thereof. Thereamong, the polymerization inhibitor is preferably a phenol.

As for the amount of the polymerization inhibitor to be used, the upper limit thereof is usually 3,000 ppm by weight, preferably 1,000 ppm by weight, particularly preferably 500 ppm by weight, while the lower limit is usually 50 ppm by weight, preferably 100 ppm by weight, with respect to the total content of the urethane (meth)acrylate-based oligomer to be produced and the raw material compounds thereof.

In the production of the urethane (meth)acrylate-based oligomer, the reaction temperature is usually 20° C. or higher, preferably 40° C. or higher, more preferably 60° C. or higher. When the reaction temperature is 20° C. or higher, the reaction rate is increased and the production efficiency thus tends to be improved, which is preferred. Meanwhile, the reaction temperature is usually 120° C. or lower, preferably 100° C. or lower. When the reaction temperature is 120° C. or lower, a side reaction such as allophanation reaction is unlikely to occur, which is preferred. Further, in cases where the reaction system contains a solvent, the reaction temperature is preferably not higher than the boiling point of the solvent and, in cases where a (meth)acrylate is contained therein, the reaction temperature is preferably 70° C. or lower from the standpoint of inhibiting the reaction of (meth)acryloyl group. The reaction time is usually about 5 to 20 hours.

The number-average molecular weight of the urethane (meth)acrylate-based oligomer obtained in this manner is preferably 500 or higher, particularly preferably 1,000 or higher, but preferably 10,000 or less, particularly preferably 5,000 or less, especially preferably 3,000 or less. When the number-average molecular weight of the urethane (meth)acrylate-based oligomer is not less than the above-described lower limit, a cured film obtained therefrom tends to have good three-dimensional processing suitability and an excellent balance of the three-dimensional processing suitability and the contamination resistance, which is preferred. Meanwhile, when the number-average molecular weight of the urethane (meth)acrylate-based oligomer is not higher than the above-described upper limit, a cured film obtained from the composition thereof tends to have good contamination resistance and an excellent balance of the three-dimensional processing suitability and the contamination resistance, which is preferred. This is presumed to be because the three-dimensional processing suitability and the contamination resistance are dependent on the distance between cross-linking points in a network structure and, when this distance is long, the structure is flexible and elastic and thus provides excellent three-dimensional processing suitability, whereas when the distance is short, the network structure is rigid and thus provides excellent contamination resistance.

<2-21. Polyester-Based Elastomer>

The polycarbonate diol according to one aspect of the present invention can be used as a polyester-based elastomer. The polyester-based elastomer is a copolymer that is constituted by a hard segment mainly composed of an aromatic polyester and a soft segment mainly composed of an aliphatic polyether, an aliphatic polyester or an aliphatic polycarbonate. When the polycarbonate diol is used as a constituent of the soft segment, superior physical properties are attained in terms of heat resistance, water resistance and the like as compared to a case where an aliphatic polyether or an aliphatic polyester is used. Even when compared to a known polycarbonate diol, the polycarbonate diol exhibits superior fluidity when melted, i.e., a melt flow rate suitable for blow molding and extrusion molding, and yields a polycarbonate ester elastomer having an excellent balance of the mechanical strength and other physical properties, and this polycarbonate ester elastomer can be suitably used in various molding materials including fibers, films and sheets, for example, molding materials for elastic fibers, boots, gears, tubes, and packings. Specifically, the polycarbonate ester elastomer can be effectively used in applications where heat resistance and durability are required, such as joint boots and wire coating materials of automobiles, home electronic parts and the like.

<2-22. Active Energy Ray-Curable Polymer Composition>

An active energy ray-curable polymer composition containing the above-described urethane (meth)acrylate-based oligomer (hereinafter, may be simply referred to as "active energy ray-curable polymer composition") will now be described.

The active energy ray-curable polymer composition preferably has a calculated molecular weight between network crosslinking points of 500 to 10,000.

In the present specification, the "calculated molecular weight between network crosslinking points" of a composition indicates an average value of the molecular weight between active energy ray-reactive groups forming a network structure in the entire composition (such groups may be hereinafter referred to as "crosslinking points"). The calculated molecular weight between network crosslinking points correlates with the network area in the formation of a network structure, and the crosslinking density decreases as the calculated molecular weight between network crosslinking points increases. In the reaction based on curing with an active energy ray, a linear polymer is formed by a reaction of a compound having only one active energy ray-reactive group (hereinafter, may be referred to as "monofunctional compound"), while a network structure is formed by a reaction of a compound having two or more active energy ray-reactive groups (hereinafter, may be referred to as "polyfunctional compound").

Therefore, the active energy ray-reactive groups contained in a polyfunctional compound constitute crosslinking points, and the calculated molecular weight between network cross linking points is determined focusing on the polyfunctional compound having such crosslinking points, while handling a monofunctional compound as a component having an effect of increasing the molecular weight between the crosslinking points of the polyfunctional compound. In addition, the determination of the calculated molecular weight between network crosslinking points is performed with an assumption that the active energy ray-reactive groups all have the same reactivity and irradiation with an active energy ray causes all of the active energy ray-reactive groups to undergo a reaction.

In a composition of a single-polyfunctional-compound system where only one kind of polyfunctional compound undergoes a reaction, the calculated molecular weight between network cross linking points is twice the average molecular weight per active energy ray-reactive group of the polyfunctional compound. For example, the calculated molecular weight between network crosslinking points is $(1,000/2) \times 2 = 1,000$ for the case of a bifunctional compound having a molecular weight of 1,000, or $(300/3) \times 2 = 200$ for the case of a trifunctional compound having a molecular weight of 300.

In a composition of a polyfunctional-compound-mixture system where plural kinds of polyfunctional compounds undergo a reaction, the calculated molecular weight between network cross linking points of the composition is an average value of the calculated molecular weights between network crosslinking points that are determined for the respective single-polyfunctional-compound systems with respect to the number of all active energy ray-reactive groups contained in the composition. For example, in a composition composed of a mixture containing 4 mol of a bifunctional compound having a molecular weight of 1,000 and 4 mol of a trifunctional compound having a molecular weight of 300, the number of all active energy ray-reactive groups in the composition is $2 \times 4 + 3 \times 4 = 20$, and the calculated molecular weight between network crosslinking points of the composition is thus $\{(1,000/2) \times 8 + (300/3) \times 12\} \times 2/20 = 520$.

When the composition contains a monofunctional compound, assuming for calculation purposes that the reaction takes place such that an equimolar of a molecular chain formed by linking of the monofunctional compound is positioned in the center of each active energy ray-reactive group (i.e., crosslinking point) of the polyfunctional compounds, the length of the molecular chain increased by the monofunctional compound per crosslinking point, which is attributed to the monofunctional compound, is a half of a value obtained by dividing the total molecular weight of the monofunctional compound by the number of all active energy ray-reactive groups of the polyfunctional compounds in the composition. In this case, since the calculated molecular weight between network crosslinking points is considered to be twice the average molecular weight per crosslinking point, the length increased by the monofunctional compound in terms of the calculated molecular weight between network crosslinking points determined for the polyfunctional compounds is a value obtained by dividing the total molecular weight of the monofunctional compound by the number of all active energy ray-reactive groups of the polyfunctional compounds in the composition.

For example, in a composition composed of a mixture containing 40 mol of a monofunctional compound having a molecular weight 100 and 4 mol of a bifunctional compound having a molecular weight 1,000, since the number of active energy ray-reactive groups of the polyfunctional compound is $2 \times 4 = 8$, the length increased by the mono functional compound in terms of the calculated molecular weight between network crosslinking points is $100 \times 40/8 = 500$. In other words, the calculated molecular weight between network crosslinking points of the composition is $1,000 + 500 = 1,500$.

Based on the above, with regard to a mixture containing $M_A$ mol of a monofunctional compound having a molecular weight of $W_A$, $M_B$ mol of an $f_B$-functional compound having a molecular weight of $W_B$ and $M_C$ mol of an $f_C$ functional compound having a molecular weight of $W_C$, the calculated molecular weight between network crosslinking points of the composition can be represented by the following formula:

$$\frac{\left(\frac{W_A M_A}{f_B M_B + f_C M_C} + \frac{2W_B}{f_B}\right) \times f_B M_B + \left(\frac{W_A M_A}{f_B M_B + f_C M_C} + \frac{2W_C}{f_C}\right) \times f_C M_C}{f_B M_B + f_C M_C} = \frac{W_A M_A + 2W_B M_B + 2W_C M_C}{f_B M_B + f_C M_C}$$

The calculated molecular weight between network crosslinking points of the active energy ray-curable polymer composition, which is determined in the above-described manner, is preferably 500 or higher, more preferably 800 or higher, still more preferably 1,000 or higher, but preferably 10,000 or less, more preferably 8,000 or less, still more preferably 6,000 or less, yet still more preferably 4,000 or less, particularly preferably 3,000 or less.

When the calculated molecular weight between network crosslinking points is 10,000 or less, a cured film obtained from the composition tends to have good contamination resistance and an excellent balance of the three-dimensional processing suitability and the contamination resistance, which is preferred. Meanwhile, when the calculated molecular weight between network crosslinking points is 500 or higher, the resulting cured film tends to have good three-dimensional processing suitability and an excellent balance of the three-dimensional processing suitability and the contamination resistance, which is preferred. The is presumed to be because the three-dimensional processing suitability and the contamination resistance are dependent on the distance between crosslinking points in a network structure and, when this distance is long, the structure is flexible and elastic and thus provides excellent three-dimensional processing suitability, whereas when the distance is short, the network structure is rigid and thus provides excellent contamination resistance.

The active energy ray-curable polymer composition may further contain a component (s) other than the urethane (meth)acrylate-based oligomer. Examples of such other components include an active energy ray-reactive monomer, an active energy ray-curable oligomer, a polymerization initiator, a photosensitizer, an additive, and a solvent.

In the active energy ray-curable polymer composition, the content of the urethane (meth)acrylate-based oligomer is preferably not less than 40% by weight, more preferably not less than 60% by weight, with respect to the total amount of active energy ray-reactive components including the urethane (meth)acrylate-based oligomer. The upper limit of the content is 100% by weight. When the content of the urethane (meth)acrylate-based oligomer is 40% by weight or more, the composition tends to have favorable curability and exhibit an improved three-dimensional processing suitability when made into a cured product, without an excessive increase in the mechanical strength.

Further, in the active energy ray-curable polymer composition, the higher the content of the urethane (meth) acrylate-based oligomer, the more preferred it is in terms of elongation and film-forming properties; however, a lower content is more preferred in terms of reducing the viscosity. From these standpoints, the content of the urethane (meth) acrylate-based oligomer is preferably not less than 50% by weight, more preferably not less than 70% by weight, with respect to the total amount of all components including other components in addition to the above-described active energy ray-reactive components. The upper limit value of the content of the urethane (meth)acrylate-based oligomer is 100% by weight, and the content is preferably not higher than this value.

Moreover, in the active energy ray-curable polymer composition, from the standpoints of, for example, achieving excellent curing rate and surface curability of the composition and allowing the composition to leave no tack, the total content of the active energy ray-reactive components including the urethane (meth)acrylate-based oligomer is preferably not less than 60% by weight, more preferably not less than 80% by weight, still more preferably not less than 90% by weight, particularly preferably not less than 95% by weight, with respect to the total amount of the composition. The upper limit of the content is 100% by weight.

As the above-described active energy ray-reactive monomer, any known active energy ray-reactive monomer can be used. Such an active energy ray-reactive monomer is used for the purpose of, for example, adjusting the hydrophilicity/hydrophobicity of the urethane (meth)acrylate-based oligomer and the physical properties, such as hardness and elongation, of a cured product obtained from the resulting composition. Such an active energy ray-reactive monomer may be used singly, or two or more thereof may be used in combination.

Examples of the active energy ray-reactive monomer include vinyl ethers, (meth)acrylamides and (meth)acrylates, specifically aromatic vinyl-based monomers, such as styrene, α-methylstyrene, α-chlorostyrene, vinyltoluene, and divinylbenzene; vinyl ester monomers, such as vinyl acetate, vinyl butyrate, N-vinylformamide, N-vinylacetamide, N-vinyl-2-pyrrolidone, N-vinylcaprolactam, and divinyl adipate; vinyl ethers, such as ethylvinyl ether and phenylvinyl ether; allyl compounds, such as diallyl phthalate, trimethylolpropane diallyl ether, and allyl glycidyl ether; (meth)acrylamides, such as (meth)acrylamide, N,N-dimethylacrylamide, N,N-dimethylmethacrylamide, N-methylol (meth)acrylamide, N-methoxymethyl (meth)acrylamide, N-butoxymethyl (meth)acrylamide, N-t-butyl (meth)acrylamide, (meth)acryloyl morpholine, and methylenebis-(meth)acrylamide; monofunctional (meth)acrylates, such as (meth)acrylic acid, methyl (meth)acrylate, ethyl (meth)acrylate, propyl (meth)acrylate, n-butyl (meth)acrylate, i-butyl (meth)acrylate, t-butyl (meth)acrylate, hexyl (meth)acrylate, 2-ethylhexyl (meth)acrylate, lauryl (meth) acrylate, stearyl (meth)acrylate, tetrahydrofurfuryl (meth) acrylate, morpholyl (meth)acrylate, 2-hydroxyethyl (meth) acrylate, 2-hydroxypropyl (meth)acrylate, 4-hydroxybutyl (meth)acrylate, glycidyl (meth)acrylate, dimethylaminoethyl (meth)acrylate, diethylaminoethyl (meth)acrylate, benzyl (meth)acrylate, cyclohexyl (meth)acrylate, phenoxyethyl (meth)acrylate, tricyclodecane (meth)acrylate, dicyclopentenyl (meth)acrylate, dicyclopentenyloxyethyl (meth) acylate, dicyclopentanyl (meth)acrylate, allyl (meth) acrylate, 2-ethoxyethyl (meth)acrylate, isobornyl (meth) acrylate, and phenyl (meth)acrylate; and polyfunctional (meth)acrylates, such as ethylene glycol di(meth)acrylate, diethylene glycol di(meth)acrylate, triethylene glycol di(meth)acrylate, tetraethylene glycol di(meth)acrylate, polyethylene glycol (n=5 to 14) di(meth)acrylate, propylene glycol di(meth)acylate, dipropylene glycol di(meth)acrylate, tripropylene glycol di(meth)acrylate, tetrapropylene glycol di(meth)acrylate, polypropylene glycol (n=5 to 14) di(meth) acrylate, 1,3-butylene glycol di(meth)acrylate, 1,4-butanediol di(meth)acrylate, polybutylene glycol (n=3 to 16) di(meth)acrylate, poly(1-methylbutylene glycol) (n=5 to 20) di(meth)acrylate, 1,6-hexanediol di(meth)acrylate, 1,9-nonanediol di(meth)acrylate, neopentyl glycol di(meth) acrylate, hydroxypivalic acid neopentyl glycol di(meth) acrylate, dicyclopentanediol di(meth)acrylate, tricyclodecane di(meth)acrylate, trimethylolpropane tri (meth)acrylate, pentaerythritol tri(meth)acrylate, pentaerythritol tetra(meth)acrylate, ditrimethylolpropane tetra (meth)acrylate, dipentaerythritol tetra(meth)acrylate, dipentaerythritol penta(meth)acrylate, dipentaerythritol hexa(meth)acrylate, trimethylolpropane trioxyethyl (meth)acrylate, trimethylolpropane trioxypropyl (meth)acrylate, trimethylolpropane polyoxyethyl (meth)acrylate, trimethylolpropane polyoxypropyl (meth)acrylate, tris(2-hydroxyethyl)isocyanurate tri(meth)acrylate, tris(2-hydroxyethyl)isocyanurate di(meth)acrylate, ethylene oxide-added bisphenol A di(meth)acrylate, ethylene oxide-added bisphenol F di(meth)acrylate, propylene oxide-added bisphenol A di(meth)acrylate, propylene oxide-added bisphenol F di(meth)acrylate, tricyclodecanedimethanol di(meth) acrylate, bisphenol A epoxy di(meth)acrylate, and bisphenol F epoxy di(meth)acrylate.

Thereamong, particularly in those applications where coatability is required, monofunctional (meth)acrylates having a ring structure in the molecule, such as (meth)acryloylmorpholine, tetrahydrofurfuryl (meth)acrylate, benzyl (meth)acrylate, cyclohexyl (meth)acrylate, trimethylcyclohexyl (meth)acrylate, phenoxyethyl (meth)acrylate, tricyclodecane (meth)acrylate, dicyclopentenyl (meth)acrylate, isobornyl (meth)acrylate and (meth)acrylamide, are preferred and, in those applications where mechanical strength is required in the resulting cured product, polyfunctional (meth)acrylates, such as 1,4-butanediol di(meth)acrylate, 1,6-hexanediol di(meth)acrylate, 1,9-nonanediol di(meth) acrylate, neopentyl glycol di(meth)acrylate, tricyclodecane di(meth)acrylate, trimethylolpropane tri(meth)acrylate, pentaerythritol tri(meth)acrylate, pentaerythritol tetra(meth) acrylate, dipentaerythritol tetra(meth)acrylate, dipentaerythritol penta(meth)acrylate and dipentaerythritol hexa(meth) acrylate, are preferred.

In the active energy ray-curable polymer composition, from the standpoint of adjusting the viscosity of the composition as well as the physical properties of the resulting cured product such as hardness and elongation, the content of the active energy ray-reactive monomer is preferably 50° by weight or less, more preferably 30% by weight or less, still more preferably 20% by weight or less, particularly preferably 10% by weight or less, with respect to the total amount of the composition.

As the above-described active energy ray-curable oligomer, such an oligomer may be used singly, or two or more thereof may be used in combination. Examples of the active energy ray-curable oligomer include epoxy (meth)acrylate-based oligomers and acryl (meth)acrylate-based oligomers.

In the active energy ray-curable polymer composition, from the standpoint of, for example, adjusting the physical properties of the resulting cured product such as hardness and elongation, the content of the active energy ray-reactive oligomer is preferably 50% by weight or less, more preferably 30% by weight or less, still more preferably 20% by weight or less, particularly preferably 10% by weight or less, with respect to the total amount of the composition.

The above-described polymerization initiator is mainly used for the purpose of, for example, improving the efficiency of initiating a polymerization reaction that proceeds under irradiation with an active energy ray, such as an ultraviolet ray or an electron beam. As the polymerization initiator, a radical photopolymerization initiator that is a compound having a property of generating a radical with light is generally used, and any known radical photopolymerization initiator can be used. Such a polymerization initiator may be used singly, or two or more thereof may be used in combination. Further, a radical photopolymerization initiator and a photosensitizer may be used in combination as well.

Examples of the radical photopolymerization initiator include benzophenone, 2,4,6-trimethylbenzophenone, 4,4-bis(diethylamino)benzophenone, 4-phenylbenzophenone, methyl-o-benzoyl benzoate, thioxanthone, diethylthioxanthone, isopropylthioxanthone, chlorothioxanthone, 2-ethylanthraquinone, t-butylanthraquinone, diethoxyacetophenone, 2-hydroxy-2-methyl-1-phenylpropan-1-one, benzyl dimethyl ketal, 1-hydroxycyclohexyl phenyl ketone, benzoin methyl ether, benzoin ethyl ether, benzoin isopropyl ether, benzoin isobutyl ether, methylbenzoyl formate, 2-methyl-1-[4-(methylthio)phenyl)]-2-morpholinopropan-1-one, 2,6-dimethylbenzoyldiphenylphosphine oxide, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)phenylphosphine oxide, and 2-hydroxy-1-[4-[4-(2-hydroxy-2-methyl-propionyl)-benzyl]-pheny l]-2-methyl-propan-1-one.

Thereamong, from the standpoint of attaining a high curing rate and sufficiently increasing the crosslinking density, benzophenone, 2-hydroxy-2-methyl-1-phenylpropan-1-one, 1-hydroxycyclohexyl phenyl ketone, 2,4,6-trimethylbenzoyldiphenylphosphine oxide and 2-hydroxy-1-[4-[4-(2-hydroxy-2-methyl-propionyl)-benzyl]-pheny l]-2-methyl-propan-1-one are preferred, and 1-hydroxycyclohexyl phenyl ketone, 2,4,6-trimethylbenzoyldiphenylphosphine oxide and 2-hydroxy-1-[4-[4-(2-hydroxy-2-methyl-propionyl)-benzyl]-pheny l]-2-methyl-propan-1-one are more preferred.

When the active energy ray-curable polymer composition contains a compound having a cationic polymerizable group such as an epoxy group along with a radical polymerizable group, a cationic photopolymerization initiator may also be incorporated therein as a polymerization initiator along with the above-described radical photopolymerization initiator. As this cationic photopolymerization initiator, any known cationic photopolymerization initiator can be used.

In the active energy ray-curable polymer composition, the content of these polymerization initiators is preferably 10 parts by weight or less, more preferably 5 parts by weight or less, with respect to a total of 100 parts by weight of the above-described active energy ray-reactive components. When the content of the polymerization initiators is 10 parts by weight or less, a reduction in the mechanical strength caused by decomposed initiators is unlikely to occur, which is preferred.

The above-described photosensitizer may be used for the same purpose as the polymerization initiators. The photosensitizer may be used singly, or two or more thereof may be used in combination. As the photosensitizer, any known photosensitizer can be used within a range where the effects of the present invention are obtained. Examples of such a photosensitizer include ethanolamine, diethanolamine, triethanolamine, N-methyldiethanolamine, methyl 4-dimethylaminobenzoate, ethyl 4-dimethylaminobenzoate, amyl 4-dimethylaminobenzoate, and 4-dimethylaminoacetophenone.

In the active energy ray-curable polymer composition, the content of the photosensitizer is preferably 10 parts by weight or less, more preferably 5 parts by weight or less, with respect to a total of 100 parts by weight of the above-described active energy ray-reactive components. When the content of the photosensitizer is 10 parts by weight or less, a reduction in the mechanical strength due to a decrease in the crosslinking density is unlikely to occur, which is preferred.

The above-described additive is optional, and a variety of materials that are added to a composition used for the same application can be used as the additive. Such an additive may be used singly, or two or more thereof may be used in combination. Examples of the additive include fillers, such as glass fibers, glass beads, silica, alumina, calcium carbonate, mica, zinc oxide, titanium oxide, talc, kaolin, metal oxides, metal fibers, iron, lead and metal powders; carbon materials, such as carbon fibers, carbon blacks, graphites, carbon nanotubes and fullerenes (e.g., C60) (fillers and carbon materials may be hereinafter collectively referred to as "inorganic components"); modifiers, such as antioxidants, thermal stabilizers, ultraviolet absorbers, HALS (hindered-amine light stabilizers), anti-fingerprint agents, surface hydrophilization agents, antistatic agents, lubricity-imparting agents, plasticizers, release agents, antifoaming agents, leveling agents, precipitation inhibitors, surfactants, thixotropy-imparting agents, lubricants, flame retardants, flame retardant aids, polymerization inhibitors, bulking agents, and silane coupling agents; coloring agents, such as pigments, dyes, and hue modifiers; and curing agents, catalysts and curing accelerators, which are required for the synthesis of monomers and/or oligomers thereof or inorganic components.

In the active energy ray-curable polymer composition, the content of these additives is preferably 10 parts by weight or less, more preferably 5 parts by weight or less, with respect to a total of 100 parts by weight of the above-described active energy ray-reactive components. When the content of the additives is 10 parts by weight or less, a reduction in the mechanical strength due to a decrease in the crosslinking density is unlikely to occur, which is preferred.

The above-described solvent can be used for the purpose of adjusting the viscosity of the active energy ray-curable polymer composition in accordance with, for example, the coating method employed for forming a coating film of the active energy ray-curable polymer composition. The solvent may be used singly, or two or more thereof may be used in combination. As the solvent, any known solvent can be used within a range where the effects of the present invention are obtained. Examples of a preferred solvent include toluene, xylene, ethyl acetate, butyl acetate, isopropanol, isobutanol, cyclohexane, methyl ethyl ketone, and methyl isobutyl ketone. The solvent can be usually used in an amount of less than 200 parts by weight with respect to 100 parts by mass of solid components of the active energy ray-curable polymer composition.

A method of incorporating an optional component(s), such as the above-described additive (s), into the active energy ray-curable polymer composition is not particularly restricted, and examples thereof include conventionally known mixing and dispersion methods. In order to more certainly disperse the optional component(s), it is preferred to perform a dispersion treatment using a disperser. Specifically, a treatment method using, for example, a twin-roll mill, a triple-roll mill, a bead mill, a ball mill, a sand mill, a pebble mill, a trammel mill, a sand grinder, a Szegvari attritor, a planetary stirrer, a high-speed impeller disperser, a high-speed stone mill, a high-speed impact mill, a kneader, a homogenizer, or an ultrasonic disperser may be employed.

The viscosity of the active energy ray-curable polymer composition can be adjusted as appropriate in accordance with the intended use, the mode of use and the like of the composition; however, from the standpoints of the ease of handling, coatability, moldability, stereolithographic properties and the like, the viscosity measured by an E-type viscometer (rotor: 1°34'×R24) at 25° C. is preferably 10 mPa·s or higher, more preferably 100 mPa·s or higher, but preferably 100,000 mPa·s or less, more preferably 50,000 mPa·s or less. The viscosity of the active energy ray-curable polymer composition can be adjusted by changing, for example, the content of the urethane (meth)acrylate-based oligomer, and the types and the blending ratios of the above-described optional components.

As a method of coating the active energy ray-curable polymer composition, any known method, such as a bar coater method, an applicator method, a curtain flow coater method, a roll coater method, a spray method, a gravure coater method, a comma coater method, a reverse roll coater method, a lip coater method, a die coater method, a slot die coater method, an air knife coater method or a dip coater method, can be applied and, thereamong, a bar coater method and a gravure coater method are preferred.

<2-23. Cured Film and Laminate>

A cured film can be obtained by irradiating the active energy ray-curable polymer composition with an active energy ray.

As the active energy ray for curing the composition, for example, an infrared ray, visible light, ultraviolet ray, X-ray, electron beam, α-ray, β-ray, or γ-ray can be used. From the standpoints of the equipment cost and the productivity, it is preferred to use an electron beam or an ultraviolet ray and, as a light source, for example, an electron beam irradiation apparatus, an ultrahigh-pressure mercury lamp, a high-pressure mercury lamp, a medium-pressure mercury lamp, a low-pressure mercury lamp, a metal halide lamp, an Ar laser, a He—Cd laser, a solid-state laser, a xenon lamp, a high-frequency induction mercury lamp, or sunlight is suitable.

The irradiation dose of the active energy ray can be selected as appropriate in accordance with the type of the active energy ray and, for example, when the curing is performed by electron beam irradiation, the irradiation dose is preferably 1 to 10 Mrad. Meanwhile, when the curing is performed by ultraviolet ray irradiation, the irradiation dose is preferably 50 to 1,000 mJ/cm$^2$. The atmosphere during the curing may be the air or an inert gas such as nitrogen and argon. Further, the irradiation may be performed in a closed space between a film or glass and a metal mold.

The thickness of the cured film may be decided as appropriate in accordance with the intended use; however, the lower limit is preferably 1 μm, more preferably 3 μm, particularly preferably 5 μm, while the upper limit is preferably 200 μm, more preferably 100 μm, particularly preferably 50 μm. When the film thickness is 1 μm or greater, the design properties and functionality are favorably expressed after three-dimensional processing, whereas when the film thickness is 200 μm or less, good internal curability and three-dimensional processing suitability are attained, both of which cases are preferred. Further, for the industrial use, the lower limit of the thickness of the cured film is preferably 1 μm, while the upper limit is preferably 100 μm, more preferably 50 μm, particularly preferably 20 μm, most preferably 10 μm.

A laminate can be obtained by arranging a layer composed of the above-described cured film on a substrate. This laminate is not particularly restricted as long as it has a layer composed of the cured film, and the laminate may have a layer other than the substrate and the cured film, between or outside the substrate and the cured film. Moreover, the laminate may have a plurality of substrates and/or cured film layers.

As a method of obtaining a laminate having plural cured film layers, any known method, such as a method in which all of the layers are laminated in an uncured state and subsequently cured with an active energy ray, a method in which a lower layer is cured or semi-cured with an active energy ray and an upper layer is subsequently applied thereon, followed by curing of the resultant again with an active energy ray, or a method in which layers are each applied onto a release film or a base film and these layers are subsequently pasted together in an uncured or semi-cured state, can be employed; however, from the standpoint of improving the adhesion between the layers, a method in which the layers are laminated in an uncured state and subsequently cured with an active energy ray is preferred. As a method of laminating the layers in an uncured state, any known method, examples of which include, but not limited to: sequential coating of applying a lower layer first and then overlaying an upper layer thereon, and simultaneous multi-layer coating of simultaneously applying two or more layers from multiple slits in a laminated manner, can be employed.

Examples of the substrate include articles of various shapes, for example, plates made of various plastics, such as polyesters (e.g., polyethylene terephthalate and polybutylene terephthalate), polyolefins (e.g., polypropylene and polyethylene), nylons, polycarbonates and (meth)acrylic resins, glasses, or metals.

The cured film can be a film that has excellent contamination resistance against general household contaminants, such as inks and ethanol, as well as excellent hardness, and laminates using the cured film as a coating film on various substrates can have excellent design properties and surface protection.

Further, taking into consideration the calculated molecular weight between network crosslinking points, the active energy ray-curable polymer composition is capable of yielding a cured film which satisfies such flexibility that can conform to deformation in three-dimensional processing, the elongation at break, the mechanical strength, the contamination resistance and the hardness all at the same time.

Moreover, the active energy ray-curable polymer composition is expected to enable simple production of a thin film-form resin sheet by single-layer coating.

The elongation at break of the cured film, which is a value measured for the cured film cut into a width of 10 mm by performing a tensile test using a TENSILON tensile tester (TENSILON UTM-III-100, manufactured by Orientec Co., Ltd.) under the conditions of a temperature of 23° C., a tensile rate of 50 mm/min and a chuck distance of 50 mm, is preferably not less than 50%, more preferably not less than 75%, still more preferably not less than 100%, particularly preferably not less than 120%.

The above-described cured film and laminate can be used as films alternative to paint coating, and they can be effectively applied to, for example, construction/decorative materials for interiors and exteriors, and various members of automobiles, home electronics and the like.

EXAMPLES

The present invention will now be described more concretely by way of Examples and Comparative Examples; however, the present invention is not restricted thereto within the gist of the present invention.

[Evaluation Methods]

Polycarbonate diols and polyurethanes obtained in the below-described Examples and Comparative Examples were evaluated by the following methods.

[Evaluation of Polycarbonate Dials]

<Quantification of Content of Terminal Phenoxy Group, Diol, and Phenol>

The subject polycarbonate diol was dissolved in $CDCl_3$, and 400-MHz $^1$H-NMR spectroscopy (AL-400, manufactured by JEOL Ltd.) was performed to identify the terminal phenoxy group, a diol(s), and a phenol(s) based on the signal positions of the respective components, after which the content of each component was calculated from integral values. The detection limits in this process were 100 ppm by weight for the weight of a phenol with respect to the weight of the whole sample, and 0.1% by weight for diol compounds such as the compound represented by Formula (A) and the compound represented by Formula (B). The ratio of the terminal phenoxy group was calculated from the ratio between an integral value for one proton of the terminal phenoxy group and an integral value for one proton of a whole terminal, and the detection limit for the terminal phenoxy group was 0.05% with respect to a whole terminal.

<Hydroxyl Value and Number-Average Molecular Weight>

The hydroxyl value of the subject polycarbonate diol was measured by a method using an acetylation reagent in accordance with JIS K1557-1.

Further, from the thus measured hydroxyl value, the number-average molecular weight was determined using the following Formula (II):

$$\text{Number-average molecular weight} = 2 \times 56.1/(\text{hydroxyl value} \times 10^{-3}) \quad (II)$$

<Molar Ratios of Structural Unit Derived from Formula (A) and Structural Unit Derived from Formula (B)>

The subject polycarbonate diol was dissolved in $CDCl_3$, and 400-MHz $^1$H-NMR spectroscopy (AL-400, manufactured by JEOL Ltd.) was performed to determine the molar ratio of a structural unit derived from Formula (A) and that of a structural unit derived from Formula (B) based on the signal positions of the respective components. The molar ratio between the structural unit derived from Formula (A) and the structural unit derived from Formula (B), the molar ratio of the structural unit derived from Formula (A), and the molar ratio of the structural unit derived from Formula (B) may be hereinafter referred to as "(A)/(B)", "a" and "b", respectively.

<Content Ratio of Branched-Chain Moiety in Polymer>

The content ratio of branched-chain moiety in the subject polymer was calculated using the following Formula (III):

$$\text{(Content ratio of branched-chain moiety in polymer)} = \text{(Total molecular weight of } R^1 \text{ and } R^2) \times (T+1) \times a/(\text{Number-average molecular weight of polycarbonate diol}) \quad (III)$$

In this Formula (III), T represents a total number of the structural units of Formulae (A) and (B) that are contained in the polycarbonate dial, and a represents the molar ratio of the structural unit derived from Formula (A).

The total number (T) of the structural units of Formulae (A) and (B) that are contained in the polycarbonate diol is calculated from the number-average molecular weight of the polycarbonate diol, the molar ratios of the structural unit derived from Formula (A) and the structural unit derived from Formula (B), and the molecular weights of Formula (C) and Formula (D).

<Content Ratio of Carbonate Group in Polymer>

In the same manner as the content ratio of branched-chain moiety in the subject polymer, the content ratio of carbonate group in the polymer of the subject polycarbonate diol was calculated using the following Formula (IV):

$$\text{(Content ratio of carbonate group in polymer)} = \text{(Molecular weight of carbonate group)} \times T/(\text{Number-average molecular weight of polycarbonate diol}) \quad (IV)$$

<Value of Formula (I)>

The value of Formula (I) is calculated by: (Content ratio of branched-chain moiety in polymer)/(Content ratio of carbonate group in polymer)×100(%). In other words, from the above, the value of Formula (I) is expressed as follows: Formula (I)={(Total molecular weight of $R^1$ and $R^2$)×(T+1)×a/(Number-average molecular weight of polycarbonate diol)}/{(Molecular weight of carbonate group)×T/(Number-average molecular weight of polycarbonate diol)}×100(%).

<Measurement of Melting Peak Temperature and Heat of Fusion>

About 10 mg of the subject polycarbonate diol enclosed in aluminum pan and, using EXSTAR DSC6200 (manufactured by Seiko Instrument, Inc.), an operation of raising and lowering the temperature from 30° C. to 150° C. at a rate of 20° C./min, subsequently from 150° C. to −120° C. at a rate of 40° C./min and then from −120° C. to 120° C. at a rate of 20° C./min was performed in a nitrogen atmosphere. From the thus obtained melting peak, the melting peak temperature and the amount of heat of fusion were determined.

<Catalyst Metal Content in Polycarbonate Diol-Containing Compositions>

About 0.1 g of the subject polycarbonate diol-containing composition was weighed and dissolved in 4 mL of acetonitrile, and 20 mL of pure water was subsequently added thereto so as to allow a polycarbonate diol to precipitate, after which the thus precipitated polycarbonate diol was removed by filtration. The filtered solution was diluted with pure water to a prescribed concentration, and the metal ion concentration was analyzed by ion chromatography. The metal ion concentration of acetonitrile used as a solvent was measured as a blank value, and a value obtained by subtracting the thus measured metal ion concentration of the solvent was defined as the metal content in the polycarbonate diol-containing composition. The measurement conditions were as shown in Table 1 below. Using the analysis results and calibration curves that had been prepared in advance, the concentrations of magnesium, calcium and barium ions were determined.

TABLE 1

| Analysis apparatus | "DX-320" manufactured by Nippon Dionex K. K. CHROMATOPAC "C-R7A" manufactured by Shimadzu Corporation |
|---|---|
| Separation column | IonPac CS12A |
| Guard column | IonPac CG12A |
| Flow rate | 1.0 mL/min |
| Injection volume | 1.5 mL |
| Pressure | 960 to 990 psi |
| Oven temperature | 35° C. |
| Detector sensitivity | RANGE, 200 μs |
| Suppressor | CSRS, current value: 60 mA |
| Eluent | 20-mmol/L methanesulfonic acid |
| Retention time | Mg: 10.9 min |
|  | Ca: 13.0 min |
|  | Ba: 19.4 min |

<Content of Hydroxyaryl Compound in Polycarbonate Diol-Containing Composition>

The subject polycarbonate diol was dissolved in $CDCl_3$, and 400-MHz $^1$H-NMR spectroscopy (AL-400, manufactured by JEOL Ltd.) was performed to identify a hydroxyaryl compound based on the signal positions of the respective components, and the content of the hydroxyaryl compound was calculated from an integral value. In this process, for example, when the hydroxyaryl compound was phenol, the detection limit was 100 ppm by weight in terms of the weight of phenol with respect to the weight of the whole sample.

[Evaluation Method: Polyurethane]

<Measurement of Isocyanate Group Concentration>

After diluting 20 mL of a di-n-butylamine/toluene (weight ratio: 2/25) mixed solution with 90 mL of acetone, the resultant was titrated with a 0.5 N aqueous hydrochloric acid solution, and the amount of the aqueous hydrochloric acid solution required for neutralization was measured as a blank value. Subsequently, 1 to 2 g of the reaction solution was extracted, and 20 mL of the di-n-butylamine/toluene mixed solution was added thereto, followed by stirring at room temperature for 30 minutes. Thereafter, in the same manner as in the blank measurement, the resultant was diluted with 90 mL of acetone and then titrated with a 0.5 N aqueous hydrochloric acid solution, and the amount of the aqueous hydrochloric acid solution required for neutralization was measured, followed by quantification of the amount of residual amine. From the volume of the aqueous hydrochloric acid solution required for neutralization, the isocyanate group concentration was calculated using the following equations:

$$\text{Isocyanate group concentration (\% by weight)} = A \times 42.02/D$$

A: Isocyanate groups (mol) contained in sample used for this measurement $$A=(B-C)\times 0.5/1{,}000\times f$$

B: Amount (mL) of 0.5 N aqueous hydrochloric acid solution required for blank measurement C: Amount (mL) of 0.5 N aqueous hydrochloric acid solution required for this measurement f: Titer of aqueous hydrochloric acid solution D: Sample (g) used for this measurement <Measurement of Molecular Weight>

As for the molecular weight of the subject polyurethane, a dimethylacetamide solution was prepared such that the concentration of the polyurethane was 0.14% by weight, and the number-average molecular weight (Mn) and the weight-average molecular weight (Mw) were measured in terms of standard polystyrene using a GPC apparatus [manufactured by Tosoh Corporation, trade name: "HLC-8220" (columns: TSKGEL GMH-XL×2)].

<Method of Room-Temperature Tensile Test>

In accordance with JIS K6301, for a polyurethane test piece in the form of a strip having a width of 10 mm, a length of 100 mm and a thickness of about 50 μm, a tensile test was performed using a tensile tester (trade name: "TENSILON UTM-III-100", manufactured by Orientec Co., Ltd.) at a chuck distance of 50 mm, a tensile rate of 500 mm/min and a temperature of 23° C. (relative humidity: 60%) to measure the stress at 100° elongation and 300° elongation of the test piece as well as the elongation and the stress at break.

<Method of Low-Temperature Tensile Test>

In accordance with JIS K6301, for a polyurethane test piece in the form of a strip having a width of 10 mm, a length of 100 mm and a thickness of about 50 μm, a tensile test was performed at a tensile rate of 500 mm/min using a tensile tester (trade name: "AUTOGRAPH AG-X 5 kN", manufactured by Shimadzu Corporation) after placing the film in a thermostat bath (trade name: "THERMOSTATIC CHAMBER TCR2W-200T", manufactured by Shimadzu Corporation) set at −10° C. at a chuck distance of 50 mm and leaving the film to stand at −10° C. for 3 minutes, and the stress was measured at 100% elongation of the test piece.

<Solvent Resistance>

A polyurethane solution was applied onto a fluorocarbon resin sheet (fluorine tape NITOFLON 900, thickness=0.1 mm, manufactured by Nitto Denko Corporation) using a 9.5-mil applicator and sequentially dried under the conditions of at 50° C. for 5 hours, at 100° C. for 0.5 hours, at 100° C. for 0.5 hours in vacuum, and then at 80° C. for 15 hours. Test pieces of 3 cm×3 cm were cut out from the thus obtained polyurethane film and then placed in glass dishes of 10 cmφ in inner diameter containing 50 mL of the respective test solvents. For each test solvent, the weight of the test piece was measured after immersion at the below-described temperature for the below-described time, and the rate of change (%) in the weight of the test piece before and after the immersion (=(Weight of test piece after immersion−Weight of test piece before immersion)/Weight of test piece before immersion×100) was calculated. It is noted here that a weight change rate closer to 0% indicates superior solvent resistance.

Oleic acid resistance: the test piece was immersed in oleic acid at 80° C. for 16 hours.

Ethyl acetate resistance: the test piece was immersed in ethyl acetate at room temperature for 20 minutes.

Ethanol resistance: the test piece was immersed in ethanol at room temperature for 1 hour.

<Storage Stability Test>

The subject polyurethane solution was left to stand in a refrigerator maintained at 10° C., and a change in the polyurethane solution was visually checked at one-week intervals. An evaluation was made as follows based on the period from the initiation of storage to a point at which a change in the polyurethane solution, such as turbidity, was observed.

A change was observed within one month from the initiation of storage: x

A change was observed within three months from the initiation of storage: Δ

A change was observed within six months from the initiation of storage: ○

No change was observed for six months or longer from the initiation of storage: ◎

<Production and Evaluation of Polycarbonate Diol>

Example 1-1

To a 5-L glass separable flask equipped with a stirrer, a distillate trap and a pressure adjusting device, 1,167.5 g of 1,4-butanediol (14BD), 86.1 g of neopentyl glycol (NPG), 2,746.4 g of diphenyl carbonate (DPC) and 7.0 mL of an aqueous magnesium acetate tetrahydrate solution (concentration: 8.4 g/L, magnesium acetate tetrahydrate: 59 mg) were added, followed by purging with nitrogen gas. The contents were heat-dissolved by raising the internal temperature to 160° C. with stirring. Subsequently, after the pressure was reduced to 24 kPa over a period of 2 minutes, the reaction was allowed to proceed for 90 minutes while removing phenol out of the system. Then, the reaction was continued while reducing the pressure to 9.3 kPa over a period of 90 minutes and further to 0.7 kPa over a period of 30 minutes, after which the temperature was raised to 170° C. and the reaction was allowed to proceed for another 60 minutes while removing phenol and unreacted diol out of the system, whereby a polycarbonate diol-containing composition was produced. Thereafter, the catalyst was deactivated with an addition of 2.3 mL of a 0.85% aqueous phosphoric acid solution to obtain a polycarbonate diol-containing composition.

The thus obtained polycarbonate diol-containing composition was transferred to a thin-film distillation apparatus at a flow rate of about 20 g/min, and thin-film distillation (temperature: 170° C., pressure: 53 to 67 Pa) was performed. As the thin-film distillation apparatus, a molecular distillation apparatus Model MS-300 manufactured by Sibata Scientific Technology Ltd., which was equipped with an internal condenser having a diameter of 50 mm, a height of 200 mm and an area of 0.0314 m$^2$ and a jacket, was used.

The results of evaluating the characteristics and physical properties of the polycarbonate diol obtained by this thin-film distillation are shown in Table 2.

The thus obtained polycarbonate diol-containing composition had a hydroxyaryl compound content of 100 ppm by weight or less. Further, with regard to the magnesium content in the polycarbonate diol-containing composition, it is believed that, taking into consideration the production-purification method (thin-film distillation), the added amount (about 10 ppm by weight) remained as it was.

Example 2-1

A polycarbonate diol was obtained in the same manner as in Example 1-1 except that, in the production of the polycarbonate diol, the raw materials were changed to 926.9 g of 1,4-butanediol (14BD), 13.0 g of neopentyl glycol (NPG), 2,060.1 g of diphenyl carbonate (DPC), and 5.3 mL of an aqueous magnesium acetate tetrahydrate solution. The results of evaluating the characteristics and physical properties of the thus obtained polycarbonate diol are shown in Table 2.

The thus obtained polycarbonate diol-containing composition had a hydroxyaryl compound content of 100 ppm by weight or less.

Example 3-1

A polycarbonate diol was obtained in the same manner as in Example 1-1 except that, in the production of the polycarbonate diol, the raw materials were changed to 908.2 g of 1,4-butanediol (14BD), 26.9 g of neopentyl glycol (NPG), 2,064.9 g of diphenyl carbonate (DPC), and 5.3 mL of an aqueous magnesium acetate tetrahydrate solution. The results of evaluating the characteristics and physical properties of the thus obtained polycarbonate diol are shown in Table 2.

The thus obtained polycarbonate diol-containing composition had a hydroxyaryl compound content of 100 ppm by weight or less.

Example 4-1

A polycarbonate diol was obtained in the same manner as in Example 1-1 except that, in the production of the polycarbonate diol, the raw materials were changed to 831.5 g of 1,4-butanediol (14BD), 118.8 g of neopentyl glycol (NPG), 2,049.7 g of diphenyl carbonate (DPC), and 5.3 mL of an aqueous magnesium acetate tetrahydrate solution. The results of evaluating the characteristics and physical properties of the thus obtained polycarbonate diol are shown in Table 2.

The thus obtained polycarbonate diol-containing composition had a hydroxyaryl compound content of 100 ppm by weight or less.

Example 5-1

A polycarbonate diol was obtained in the same manner as in Example 1-1 except that, in the production of the polycarbonate diol, the raw materials were changed to 792.9 g of 1,4-butanediol (14BD), 161.7 g of neopentyl glycol (NPG), 2,045.5 g of diphenyl carbonate (DPC), and 5.3 mL of an aqueous magnesium acetate tetrahydrate solution. The results of evaluating the characteristics and physical properties of the thus obtained polycarbonate diol are shown in Table 2.

The thus obtained polycarbonate diol-containing composition had a hydroxyaryl compound content of 100 ppm by weight or less.

Example 6-1

A polycarbonate diol was obtained in the same manner as in Example 1-1 except that, in the production of the polycarbonate diol, the raw materials were changed to 359.5 g of 1,4-butanediol (14BD), 19.8 g of 2-butyl-2-ethyl-1,3-propanediol (BEPD), 820.7 g of diphenyl carbonate (DPC), and 2.1 mL of an aqueous magnesium acetate tetrahydrate solution. The results of evaluating the characteristics and physical properties of the thus obtained polycarbonate diol are shown in Table 2.

The thus obtained polycarbonate diol-containing composition had a hydroxyaryl compound content of 100 ppm by weight or less.

Comparative Example 1-1

A polycarbonate diol was obtained in the same manner as in Example 1-1 except that, in the production of the polycarbonate diol, the raw materials were changed to 1,249.2 g of 1,4-butanediol (14BD), 2,750.7 g of diphenyl carbonate (DPC), 7.1 mL of an aqueous magnesium acetate tetrahydrate solution (concentration: 8.4 g/L, magnesium acetate tetrahydrate: 60 mg) and 2.5 mL of a 0.85% aqueous phosphoric acid solution, and the temperature of the thin-film distillation was changed to 200° C. The results of evaluating the characteristics and physical properties of the thus obtained polycarbonate diol are shown in Table 2.

The thus obtained polycarbonate diol-containing composition had a hydroxyaryl compound content of 100 ppm by weight or less.

Comparative Example 2-1

A polycarbonate diol was obtained in the same manner as in Example 1-1 except that, in the production of the polycarbonate diol, the raw materials were changed to 609.7 g of 1,4-butanediol (14BD), 704.6 g of neopentyl glycol (NPG), 2,685.7 g of diphenyl carbonate (DPC), 6.9 mL of an aqueous magnesium acetate tetrahydrate solution (concentration: 8.4 g/L, magnesium acetate tetrahydrate: 58 mg) and 2.4 mL of a 0.85% aqueous phosphoric acid solution, and the temperature of the thin-film distillation was changed to 200° C. The results of evaluating the characteristics and physical properties of the thus obtained polycarbonate diol are shown in Table 2.

The thus obtained polycarbonate diol-containing composition had a hydroxyaryl compound content of 100 ppm by weight or less.

Comparative Example 3-1

A polycarbonate diol was obtained in the same manner as in Example 1-1 except that, in the production of the polycarbonate diol, the raw materials were changed to 1,224.4 g of 1,6-hexanediol (16HD), 81.2 g of neopentyl glycol (NPC), 2,194.3 g of diphenyl carbonate (DPC), and 5.7 mL of an aqueous magnesium acetate tetrahydrate solution. The results of evaluating the characteristics and physical properties of the thus obtained polycarbonate diol are shown in Table 2.

The thus obtained polycarbonate diol-containing composition had a hydroxyaryl compound content of 100 ppm by weight or less.

Comparative Example 4-1

A polycarbonate diol was obtained in the same manner as in Example 1-1 except that, in the production of the polycarbonate diol, the raw materials were changed to 273.5 g of 1,4-butanediol (14BD), 145.3 g of 2-butyl-2-ethyl-1,3-propanediol (BEPD), 781.3 g of diphenyl carbonate (DPC), and 2.0 mL of an aqueous magnesium acetate tetrahydrate solution. The results of evaluating the characteristics and physical properties of the thus obtained polycarbonate diol are shown in Table 2.

The thus obtained polycarbonate diol-containing composition had a hydroxyaryl compound content of 100 ppm by weight or less.

TABLE 2

| | Example 1-1 | Example 2-1 | Example 3-1 | Example 4-1 | Example 5-1 | Example 6-1 | Comparative Example 1-1 | Comparative Example 2-1 | Comparative Example 3-1 | Comparative Example 4-1 |
|---|---|---|---|---|---|---|---|---|---|---|
| Formulation | NPG/14BD | NPG/14BD | NPG/14BD | NPG/14BD | NPG/14BD | BEPD/14BG | 14BD | NPG/14BD | NPG/16HD | BEPD/14BD |
| Property | white solid | white solid | white solid | white solid | white solid | white solid | white solid | viscous liquid | white solid | viscous liquid |
| Hydroxyl value (mg-KOH/g) | 54.0 | 51.2 | 54.1 | 52.6 | 50.7 | 54.8 | 55.7 | 53.9 | 51.5 | 61.2 |
| Number-average molecular weight Mn | 2,078 | 2,191 | 2,074 | 2,133 | 2,213 | 2,047 | 2,014 | 2,082 | 2,179 | 1,833 |
| (A)/(B) | 6/94 | 1/99 | 3/97 | 10/90 | 15/85 | 3/97 | 0/100 | 45/55 | 7/93 | 22/78 |
| Terminal phenoxy group | not detected | not detected | not detected | not detected | not detected | not detected | not detected | not detected | not detected | not detected |
| Formula (I) | 3.2 | 0.5 | 1.6 | 5.3 | 7.9 | 4.6 | 0.0 | 23.9 | 3.8 | 33.8 |
| Amount of heat of fusion (J/g) | 3.8 | 55.5 | 15.5 | peak not detected | peak not detected | 65.5 | 39.2 | peak not detected | 37.3 | peak not detected |

[Production and Evaluation of Polyurethanes]

Example 1-2

To a separable flask equipped with a thermocouple and a condenser tube, 98.5 g of the polycarbonate diol produced in Example 1-1, which had been heated to 80° C. in advance, was added, and the separable flask was immersed in a 60° C. oil bath. Subsequently, 25.4 g of 4,4'-dicyclohexylmethane diisocyanate (hereinafter, referred to as "H12MDI", manufactured by Tokyo Chemical Industry Co., Ltd.) and 0.4 g of triisooctyl phosphite (hereinafter, referred to as "TiOP", manufactured by Tokyo Chemical Industry Co., Ltd.) were further added, and the inside of the flask was heated to 80° C. for about 1 hour with stirring at 60 rpm in a nitrogen atmosphere. Thereafter, 9.4 mg of NEOSTANN U-830 (hereinafter, referred to as "U-830", manufactured by Nitto Kasei Co., Ltd.) was added as an urethanization catalyst and, once heat generation subsided, the oil bath was heated to 100° C., followed by further stirring for about 4 hours. The concentration of isocyanate groups was analyzed and consumption of a theoretical amount of isocyanate groups was confirmed to obtain a prepolymer (hereinafter, may be abbreviated as "PP"). Then, 111.8 g of the thus obtained PP was diluted with 13.3 g of dehydrated toluene (manufactured by Wako Pure Chemical Industries, Ltd.). Subsequently, 256.6 g of dehydrated N,N-dimethylformamide (hereinafter, referred to as "DMF"; manufactured by Wako Pure Chemical Industries, Ltd.) was added, the flask was immersed in a 55° C. oil bath, and the PP was dissolved with stirring at about 200 rpm. After analyzing the concentration of isocyanate groups in the resulting prepolymer solution, the flask was immersed in an oil bath set at 35° C., and isophorone diamine (hereinafter, referred to as "IPDA"; manufactured by Tokyo Chemical Industry Co., Ltd.) in a required amount calculated from the residual isocyanate, which was 6.6 g, was added in parts with stirring at 150 rpm.

After about 1 hour of stirring, 0.5 g of morpholine (manufactured by Tokyo Chemical Industry Co., Ltd.) was added, and the resultant was further stirred for 1 hour to obtain a polyurethane solution. This polyurethane solution was applied onto a polyethylene film at a uniform thickness using a doctor blade and subsequently dried using a dryer, whereby a polyurethane film was obtained. The results of evaluating the physical properties of the thus obtained polyurethane solution and polyurethane film are shown in Table 3.

Example 2-2

A polyurethane solution and a polyurethane film were obtained in the same manner as in Example 1-2 except that, in the polyurethane production, the polycarbonate diol produced in Example 2-1 was used and the weights of H12MDI and IPDA were changed as shown in Table 3. The results of evaluating the physical properties of the thus obtained polyurethane solution and polyurethane film are shown in Table 3.

Example 3-2

A polyurethane solution and a polyurethane film were obtained in the same manner as in Example 1-2 except that, in the polyurethane production, the polycarbonate dial produced in Example 3-1 was used and the weights of H12MDI and IPDA were changed as shown in Table 3. The results of evaluating the physical properties of the thus obtained polyurethane solution and polyurethane film are shown in Table 3.

Example 4-2

A polyurethane solution and a polyurethane film were obtained in the same manner as in Example 1-2 except that, in the polyurethane production, the polycarbonate diol produced in Example 4-1 was used and the weights of H12MDI and IPDA were changed as shown in Table 3. The results of evaluating the physical properties of the thus obtained polyurethane solution and polyurethane film are shown in Table 3.

Example 5-2

A polyurethane solution and a polyurethane film were obtained in the same manner as in Example 1-2 except that, in the polyurethane production, the polycarbonate dial produced in Example 5-1 was used and the weights of H12MDI and IPDA were changed as shown in Table 3. The results of evaluating the physical properties of the thus obtained polyurethane solution and polyurethane film are shown in Table 3.

Comparative Example 1-2

A polyurethane solution and a polyurethane film were obtained in the same manner as in Example 1-2 except that, in the polyurethane production, the raw materials were changed to 90.3 g of the polycarbonate diol produced in Comparative Example 1-1, 23.8 g of H12MDI, 0.3 g of TiOP, 8.5 mg of U-830, 105.2 g of PP, 11.8 g of dehydrated toluene, 243.9 g of DMF, 6.3 g of IPDA, and 0.5 g of morpholine. The results of evaluating the physical properties of the thus obtained polyurethane solution and polyurethane film are shown in Table 3.

Comparative Example 2-2

A polyurethane solution and a polyurethane film were obtained in the same manner as in Example 1-2 except that, in the polyurethane production, the raw materials were changed to 90.4 g of the polycarbonate diol produced in Comparative Example 2-1, 23.2 g of H12MDI, 0.4 g of TiOP, 10.6 mg of U-830, 88.6 g of PP, 9.8 g of dehydrated toluene, 205.8 g of DMF, 5.3 g of IPDA, and 0.3 g of morpholine. The results of evaluating the physical properties of the thus obtained polyurethane solution and polyurethane film are shown in Table 3.

Comparative Example 3-2

A polyurethane solution and a polyurethane film were obtained in the same manner as in Example 1-2 except that, in the polyurethane production, the polycarbonate diol produced in Comparative Example 3-1 was used and the weights of H12MDI and IPDA were changed as shown in Table 3. The results of evaluating the physical properties of the thus obtained polyurethane solution and polyurethane film are shown in Table 3.

Comparative Example 4-2

A polyurethane solution and a polyurethane film were obtained in the same manner as in Example 1-2 except that, in the polyurethane production, the polycarbonate diol produced in Comparative Example 4-1 was used and the weights of H12MDI and IPDA were changed as shown in Table 3. The results of evaluating the physical properties of the thus obtained polyurethane solution and polyurethane film are shown in Table 3.

TABLE 3

| | | | Example | | | | | |
|---|---|---|---|---|---|---|---|---|
| | | | Example 1-2 | Example 2-2 | Example 3-2 | Example 4-2 | Example 5-2 | Example 6-2 |
| Raw materials for polyurethane production | Polycarbonate diol | Formulation | NPG/ 14BD | NPG/ 14BD | NPG/ 14BD | NPG/ 14BD | NPG/ 14BD | BEPD/ 14BG |
| | | (Content ratio of branched-chain moiety in polymer/Content ratio of carbonate group in polymer) × 100 (%) | 3.2 | 0.5 | 1.6 | 5.3 | 7.9 | 4.6 |
| | | Hydroxyl value (mg-KOH/g) | 54.0 | 51.2 | 54.1 | 52.6 | 50.7 | 54.8 |
| | | Mn | 2,078 | 2,191 | 2,074 | 2,133 | 2,213 | 2,047 |
| | | Amount used (g) | 98.5 | 90.4 | 90.6 | 90.4 | 90.0 | 79.9 |

TABLE 3-continued

| | | | | | | | | |
|---|---|---|---|---|---|---|---|---|
| | H12MDI | Amount used (g) | 25.4 | 22.0 | 23.0 | 22.6 | 21.6 | 20.8 |
| | IPDA | Amount used (g) | 6.6 | 6.0 | 6.0 | 6.0 | 5.7 | 5.5 |
| Evaluation of physical properties of polyurethane | | Molecular weight Mw (in terms of polystyrene) | 194,000 | 174,000 | 194,000 | 175,000 | 174,000 | 163,000 |
| | Tensile test (23° C.) | 100% M (MPa) | 5.9 | 5.4 | 5.6 | 6.0 | 6.0 | 6.5 |
| | | 300% M (MPa) | 31 | 29 | 28 | 31 | 31 | 35 |
| | | Elongation at break (%) | 383 | 423 | 456 | 437 | 444 | 433 |
| | | Breaking strerigth (MPa) | 60 | 71 | 81 | 82 | 83 | 84 |
| | Tensile test (−10° C.) | 100% M (MPa) | 16.7 | 16.2 | 17.7 | 18.7 | 19.1 | 20.9 |
| | Solvent resistance test | Oleic acid (% by weight) | 17.5 | 17.6 | 17.4 | 17.2 | 18.1 | 18.1 |
| | | Ethanol (% by weight) | 18.4 | 18.8 | 19.0 | 20.0 | 21.4 | 18.6 |
| | | Ethyl acetate (% by weight) | 89.6 | 98.8 | 88.4 | 98.3 | 112.1 | 98.3 |
| | | Storage stability of polyurethane solution | ◎ | Δ | ○ | ◎ | ◎ | Δ |

| | | | Example | | | |
|---|---|---|---|---|---|---|
| | | | Comparative Example 1-2 | Comparative Example 2-2 | Comparative Example 3-2 | Comparative Example 4-2 |
| Raw materials for polyurethane production | Polycarbonate diol | Formulation | 14BD | NPG/ 14BD | NPG/ 16HD | BEPD/ 14BD |
| | | (Content ratio of branched-chain moiety in polymer/Content ratio of carbonate group in polymer) × 100 (%) | 0.0 | 23.9 | 3.8 | 33.8 |
| | | Hydroxyl value (mg-KOH/g) | 55.7 | 53.9 | 51.5 | 61.2 |
| | | Mn | 2,014 | 2,082 | 2,179 | 1,833 |
| | | Amount used (g) | 90.3 | 90.4 | 80.2 | 80.1 |
| | H12MDI | Amount used (g) | 23.8 | 23.2 | 19.6 | 23.2 |
| | IPDA | Amount used (g) | 6.3 | 5.3 | 5.1 | 6.3 |
| Evaluation of physical properties of polyurethane | | Molecular weight Mw (in terms of polystyrene) | 168,000 | 194,000 | 160,000 | 158,000 |
| | Tensile test (23° C.) | 100% M (MPa) | 6.4 | 8.8 | — | — |
| | | 300% M (MPa) | 40 | 43 | — | — |
| | | Elongation at break (%) | 370 | 325 | — | — |
| | | Breaking strerigth (MPa) | 65 | 48 | — | — |
| | Tensile test (−10° C.) | 100% M (MPa) | 18.7 | 38.4 | — | — |
| | Solvent resistance test | Oleic acid (% by weight) | 18.8 | 32.6 | 58.9 | 45.5 |
| | | Ethanol (% by weight) | 17.5 | 30.6 | 24.1 | 24.3 |
| | | Ethyl acetate (% by weight) | 99.7 | 169.4 | 108.0 | 142.6 |
| | | Storage stability of polyurethane solution | X | ◎ | — | — |

According to Table 3, it is seen that the polyurethanes obtained from the polycarbonate diol according to one aspect of the present invention not only exhibited high flexibility at both room temperature and a low temperature and high durability against various solvents, but also yielded polyurethane solutions having a high storage stability.

What is claimed is:

1. A polycarbonate diol comprising:
    a structural unit represented by the following Formula (A); and
    a structural unit represented by the following Formula (B):

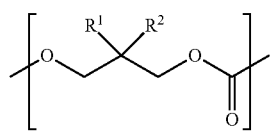

(A)

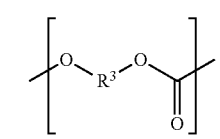

(B)

wherein, $R^1$ and $R^2$ each independently represent an alkyl group having 1 to 4 carbon atoms and, in this range of the number of carbon atoms, optionally have an oxygen atom, a sulfur atom, a nitrogen atom, a halogen atom, or a substituent containing these atoms; and $R^3$ represents a linear aliphatic hydrocarbon having 3 or 4 carbon atoms, wherein the polycarbonate diol has a number-average molecular weight of 500 to 5,000, and the value of the following Formula (I) of 0.3 to 20.0:

(Content ratio of branched-chain moiety in polymer)/ (Content ratio of carbonate group in polymer)× 100(%)     (I).

2. The polycarbonate diol according to claim 1, wherein the value of the following Formula (I) is 0.5 to 8.0:

(Content ratio of branched-chain moiety in polymer)/
(Content ratio of carbonate group in polymer)×
100(%)     (I).

3. The polycarbonate diol according to claim 1, wherein the structural unit represented by Formula (A) is derived from 2,2-dimethyl-1,3-propanediol.

4. The polycarbonate diol according to claim 1, wherein the structural unit represented by Formula (A) is derived from 2-butyl-2-ethyl-1,3-propanediol.

5. The polycarbonate diol according to claim 1, wherein the structural unit represented by Formula (B) is derived from 1,4-butanediol.

6. The polycarbonate diol according to claim 1, wherein a ratio of the number of terminal groups derived from a carbonate compound in the polycarbonate diol is 5.0% by mole or less with respect to the number of all terminal groups.

7. The polycarbonate diol according to claim 1, wherein the amount of the heat of fusion of a melting peak is 0.1 J/g to 10 J/g as measured by a differential scanning calorimeter.

8. A polycarbonate diol-containing composition, comprising a polycarbonate diol that contains a structural unit represented by the following Formula (A) and a structural unit represented by the following Formula (B):

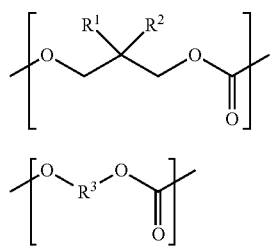

(A)

(B)

wherein, $R^1$ and $R^2$ each independently represent an alkyl group having 1 to 4 carbon atoms and, in this range of the number of carbon atoms, optionally have an oxygen atom, a sulfur atom, a nitrogen atom, a halogen atom, or a substituent containing these atoms; and $R^3$ represents a linear aliphatic hydrocarbon having 3 or 4 carbon atoms,
wherein
the polycarbonate diol has a molecular weight of 500 to 5,000,
the value of the following Formula (I) is 0.3 to 20.0:

(Content ratio of branched-chain moiety in polymer)/
(Content ratio of carbonate group in polymer)×
100(%)     (I), and wherein the polycarbonate diol-containing composition comprises a hydroxyaryl compound in an amount of 0.1% by weight or less relative to the total weight of the polycarbonate diol-containing composition.

9. The polycarbonate diol-containing composition according to claim 8, comprising at least one metal selected from Groups 1 and 2 of the periodic table.

10. The polycarbonate diol-containing composition according to claim 9, wherein the content of the metal in the polycarbonate diol-containing composition is 100 ppm by weight or less.

11. A method of producing a polycarbonate diol, the method comprising the step of performing a polymerization reaction of at least one carbonate compound (i) selected from the group consisting of dialkyl carbonates, diaryl carbonates and alkylene carbonates, a diol (ii) represented by the following Formula (C), and a diol (iii) represented by the following formula (D) in the presence of a metal compound catalyst:

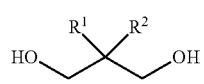

(C)

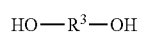

(D)

wherein, $R^1$ and $R^2$ each independently represent an alkyl group having 1 to 4 carbon atoms and, in this range of the number of carbon atoms, optionally have an oxygen atom, a sulfur atom, a nitrogen atom, a halogen atom, or a substituent containing these atoms; and $R^3$ represents a linear aliphatic hydrocarbon having 3 or 4 carbon atoms,
wherein the polycarbonate diol has a value of the following Formula (I) of 0.3 to 20.0:

(Content ratio of branched-chain moiety in polymer)/
(Content ratio of carbonate group in polymer)×
100(%)     (I).

12. A polyurethane obtainable from the polycarbonate diol according to claim 1.

13. A polyurethane obtainable from the polycarbonate diol-containing composition according to claim 8.

14. An artificial leather or a synthetic leather, obtainable using the polyurethane according to claim 12.

15. A paint or a coating agent, obtained using the polyurethane according to claim 12.

16. A thermosetting elastomer or a thermoplastic elastomer, obtainable using the polyurethane according to claim 12.

17. An aqueous polyurethane paint obtained using the polyurethane according to claim 12.

18. A pressure-sensitive adhesive or an adhesive, obtainable using the polyurethane according to claim 12.

19. An active energy ray-curable polymer composition obtainable using the polycarbonate diol according to claim 1.

* * * * *